(12) United States Patent
Sakai

(10) Patent No.: US 12,578,727 B2
(45) Date of Patent: Mar. 17, 2026

(54) PATH GENERATING METHOD, PROGRAM, PATH GENERATING DEVICE, AND AUTONOMOUS MOBILE BODY

(71) Applicant: MURATA MACHINERY, LTD., Kyoto (JP)

(72) Inventor: Tsukasa Sakai, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 335 days.

(21) Appl. No.: 17/956,886

(22) Filed: Sep. 30, 2022

(65) Prior Publication Data

US 2023/0195121 A1 Jun. 22, 2023

(30) Foreign Application Priority Data

Oct. 15, 2021 (JP) ................................. 2021-169837
Aug. 3, 2022 (JP) ................................. 2022-124388

(51) Int. Cl.
 *G05D 1/00* (2024.01)
 *A63B 47/02* (2006.01)

(52) U.S. Cl.
 CPC ......... *G05D 1/0212* (2013.01); *G05D 1/0088*
 (2013.01); *A63B 47/021* (2013.01); *A63B*
 *2047/022* (2013.01)

(58) Field of Classification Search
 None
 See application file for complete search history.

(56) References Cited

U.S. PATENT DOCUMENTS

2016/0313735 A1* 10/2016 Berkemeier ......... G05D 1/0212
2019/0337344 A1 11/2019 Yu et al.

FOREIGN PATENT DOCUMENTS

JP 2008-129695 A 6/2008
JP 2020-154719 A 9/2020
JP 2021-60324 A 4/2021
JP 2021520000 A 8/2021

* cited by examiner

*Primary Examiner* — Hongye Liang
(74) *Attorney, Agent, or Firm* — Keating & Bennett, LLP

(57) ABSTRACT

A path generating method includes setting a moving direction at each of two positions, setting a first turning circle with one of the positions as a contact point and the moving direction as a turning direction, setting a second turning circle that is within a specific area, setting a Dubins path that starts from a predetermined point of the second turning circle or ends at the predetermined point, and selecting, as a movement path, a path that is within the specific area among paths each including the first turning circle and the Dubins path.

24 Claims, 28 Drawing Sheets

PATH GENERATING METHOD, PROGRAM, PATH GENERATING DEVICE, AND AUTONOMOUS MOBILE BODY

CROSS REFERENCE TO RELATED APPLICATIONS

This application claims the benefit of priority to Japanese Patent Application No. 2021-169837 filed on Oct. 15, 2021 and Japanese Patent Application No. 2022-124388 filed on Aug. 3, 2022. The entire contents of each of these applications are hereby incorporated herein by reference.

BACKGROUND OF THE INVENTION

1. Field of the Invention

The present invention relates to a path generating method for generating a movement path of an autonomous mobile body. In particular, the present invention relates to a path generating method for generating a movement path for moving from a start point to an end point existing in a specific area. The present invention also relates to a non-transitory computer-readable medium including a program for causing a computer to execute the path generating method, a path generating device that performs the path generating method, and an autonomous mobile body including the path generating device.

2. Description of the Related Art

As the autonomous mobile body, for example, there is an autonomous mobile body that can autonomously move along a movement path obtained by combining a path determined in a specific area and a path from the inside to the outside of the specific area (e.g., see Japanese Unexamined Patent Publication No. 2020-154719). In the movement path described above, when the end point of the path defined in the specific area and the start point of the path from the inside to the outside of the specific area (a point in the specific area) are misaligned, it is necessary to generate a path (a point-to-point path) connecting the end point and the start point.

As a method for generating the point-to-point path described above, there is a method for creating a path called a "Dubins path". The "Dubins path" is a path generated by combining a turning circle having a start point on its circumference, a turning circle having an end point on its circumference, and a tangent line (a straight line or a curved line) of the two turning circles. This "Dubins path" is advantageous for generating a movement path of the autonomous mobile body that cannot move backward or is prohibited from moving backward and has a limited turning radius at the time of turning. Further, the "Dubins path" can connect the start point and the end point regardless of the positions of the start point and the end point and the moving directions (attitudes) of the autonomous mobile body at the start point and the end point.

Meanwhile, in order to avoid interference with an obstacle or the like outside the specific area, the point-to-point path needs to be generated so as to be held within the specific area. However, in the case of generation of the point-to-point path only by the conventional Dubins path, when the specific area is not larger than the turning radius of the turning circle (e.g., when the size of the specific area is six times or less the radius of the turning circle) and/or when the position of the start point and/or the end point is close to the outer periphery of the area, a part of the path is generated outside the specific area by any Dubins path, and an appropriate point-to-point path may not be generated.

SUMMARY OF THE INVENTION

Preferred embodiments of the present invention each provide a point-to-point path that is within a specific area by using the Dubins path for more combinations of start points and end points in the specific area.

Hereinafter, a plurality of aspects of preferred embodiments of the present invention will be described. These aspects can be combined in a freely selected manner as required.

A path generating method according to one aspect of a preferred embodiment of the present invention is a method for generating a movement path of an autonomous mobile body that moves from a start point in a specific area to an end point in the specific area and includes setting a moving direction at each of the start point and the end point, setting a first turning circle including a contact point at the start point or the end point and including a turning direction in the moving direction, setting a second turning circle within the specific area, setting a Dubins path that starts from a predetermined point of the second turning circle or ends at the predetermined point, and selecting, as the movement path, a path that is within the specific area among paths each including the first turning circle and the Dubins path.

In the above path generating method, before the generation of the Dubins path, a first turning circle including a contact point at the start point or the end point and including a turning direction in a moving direction at the start point or the end point is set, and then a second turning circle to be a part of the Dubins path is set. By setting the first turning circle before the generation of the Dubins path and then setting the second turning circle, it is possible to ensure an area necessary to generate the Dubins path in the specific area. As a result, a point-to-point path that is within the specific area can be generated using the Dubins path for more combinations of start points and end points in a small specific area.

In the path generating method, the first turning circle and the second turning circle may be tangent to each other with the predetermined point as a contact point. This eliminates the need for a path connecting the first turning circle and the second turning circle, so that a shorter point-to-point path can be generated.

In the above path generating method, when the start point of the movement path is a point on the circumference of the first turning circle, the setting the Dubins path may include setting Dubins path from the contact point between the first turning circle and the second turning circle to the end point. As a result, when the first turning circle is set with reference to the start point of the movement path, it is possible to generate a point-to-point path including a path from the start point of the movement path to the contact point between the first turning circle and the second turning circle and a Dubins path from the contact point to the end point of the movement path.

In the above path generating method, when the end point of the movement path is a point on the circumference of the first turning circle, the setting the Dubins path may include setting the contact point between the first turning circle and the second turning circle as a temporary end point and setting a Dubins path from the start point to the temporary end point. As a result, when the first turning circle is set with reference to the end point of the movement path, it is possible to generate a point-to-point path including a Dubins path from the start point of the movement path to the temporary end point of the second turning circle and a path for moving along the first turning circle from the temporary end point to the end point of the movement path.

In the above path generating method, when the end point is a point on the circumference of the first turning circle, the setting the Dubins path may include setting a Dubins path from the contact point between the first turning circle and the second turning circle to the start point, and reversing the Dubins path to form a path from the start point toward the contact point.

As a result, when the first turning circle is set with reference to the end point of the movement path, it is possible to generate a point-to-point path including a Dubins path from the start point of the movement path to the contact point between the first turning circle and the second turning circle and a path for moving along the first turning circle from the contact point to the end point of the movement path.

In the path generating method, the first turning circle and the second turning circle may not be in contact with each other. This makes the second turning circle flexibly settable.

In the path generating method described above, each of the first turning circle and the second turning circle may be a circle with the minimum turning radius of the autonomous mobile body. Thus, the shortest point-to-point path can be generated in consideration of the traveling performance of the autonomous mobile body.

In the path generating method, the autonomous mobile body may tow a cart. In this case, each of the first turning circle and the second turning circle may be a circle with the minimum turning radius of the autonomous mobile body including the cart towed by the autonomous mobile body. Thus, the shortest point-to-point path can be generated in consideration of the traveling performance of the autonomous mobile body that tows the cart.

The above path generating method may further include determining whether a current position of the autonomous mobile body is included in a suspension possible area that defines a position range, in which it is possible to plan that the movement path including the start point at a position at a time of stopping of the autonomous movable body by suspension of autonomous movement currently being executed at the current position and including the end point at the target position is within the specific area, when a command is issued to generate the movement path with a predetermined target position in the specific area as the end point during the autonomous movement in the specific area, suspending the autonomous movement currently being executed when the current position of the autonomous mobile body is included in the suspension possible area, and generating the movement path with a position where the stopping is made after the suspension of the autonomous movement currently being executed as the start point and the target position as the end point.

Thus, even when a command is issued to plan the movement path during the execution of the autonomous movement, it is possible to prevent the planned movement path from going out of the specific area as a result of planning the movement path from the position where the stopping is made by the suspension of the autonomous movement.

In the path generating method described above, the suspension possible area may be set as an area indicating a range of a position where the turning-circle included area can be within the specific area. The turning-circle included area includes the first turning circle settable at a position where the autonomous mobile body stops by suspending its movement while traveling straight at a maximum speed, the first turning circle settable at a position where the autonomous mobile body stops by suspending its movement while turning right at a maximum speed, and the first turning circle settable at a position where the autonomous mobile body stops by suspending its movement while turning left at a maximum speed. Thus, it is possible to more accurately determine whether the current position of the autonomous mobile body is a position suitable for suspending the autonomous movement and generating the movement path.

In the path generating method, the suspension possible area may be set for each attitude angle of the autonomous mobile body. In this case, the determining whether the current position of the autonomous mobile body is included in the suspension possible area may include selecting a suspension possible area corresponding to an attitude angle of the autonomous mobile body at the current position, and determining whether a current position of the autonomous mobile body is included in the suspension possible area selected.

Thus, it is possible to accurately determine whether the autonomous movement of the autonomous mobile body during the autonomous movement can be suspended and the point-to-point path that is within the specific area can be planned at an arbitrary attitude angle of the autonomous mobile body.

The path generating method may further include continuing the autonomous movement currently being executed when the current position of the autonomous mobile body is not included in the suspension possible area. Thus, the autonomous mobile body can be moved to another position by autonomous movement and the autonomous movement can be suspended to attempt to generate a movement path from another position.

A non-transitory computer-readable medium according to another aspect of a preferred embodiment of the present invention includes a program for causing a computer to execute the above path generating method.

A path generating device according to still another aspect of a preferred embodiment of the present invention generates a movement path of an autonomous mobile body that moves from a start point in a specific area to an end point in the specific area. The path generating device is configured or programmed to set a moving direction at the start point and the end point, set a first turning circle including a contact point at the start point or the end point and including a turning direction in the moving direction, set a second turning circle that is within the specific area, set a Dubins path that starts from a predetermined point of the second turning circle or ends at the predetermined point, and select, as the movement path, a path that is within the specific area among paths each including the first turning circle and the Dubins path.

Before generating the Dubins path, the path generating device is configured or programmed to set a first turning circle including a contact point at the start point or the end point and a moving direction at the start point or the end point as a turning direction, and then set a second turning circle to be a part of the Dubins path. By setting the first turning circle before the generation of the Dubins path and then setting the second turning circle, it is possible to ensure an area necessary for generating the Dubins path in the specific area. As a result, a point-to-point path that is within the specific area can be generated using the Dubins path for more combinations of start points and end points in a small specific area.

In the path generating device, the first turning circle and the second turning circle may be tangent to each other with the predetermined point as a contact point. This eliminates the need for generating a path connecting the first turning circle and the second turning circle, so that a shorter point-to-point path can be generated.

In the path generating device, when the start point of the movement path is a point on the circumference of the first turning circle, a Dubins path from the contact point between the first turning circle and the second turning circle to the end point may be set. As a result, when the first turning circle is set with reference to the start point of the movement path, it is possible to generate a point-to-point path including a path from the start point of the movement path to the contact point between the first turning circle and the second turning circle and a Dubins path from the contact point to the end point of the movement path.

In the path generating device, when the end point of the movement path is a point on the circumference of the first turning circle, the contact point between the first turning circle and the second turning circle may be set as a temporary end point, and a Dubins path from the start point of the movement path to the temporary end point may be set. As a result, when the first turning circle is set with reference to the end point of the movement path, it is possible to generate a point-to-point path including a Dubins path from the start point of the movement path to the temporary end point of the second turning circle and a path for moving along the first turning circle from the temporary end point to the end point of the movement path.

In the path generating device, when the end point of the movement path is a point on the circumference of the first turning circle, a Dubins path from the contact point of the first turning circle and the second turning circle to the start point may be set, and the path from the start point toward the contact point may be generated by reversing the Dubins path. As a result, when the first turning circle is set with reference to the end point of the movement path, it is possible to generate a point-to-point path including a Dubins path from the start point of the movement path to the contact point between the first turning circle and the second turning circle and a path for moving along the first turning circle from the contact point to the end point of the movement path.

In the path generating device, the first turning circle and the second turning circle may not be in contact with each other. This makes the second turning circle flexibly settable.

In the path generating device, each of the first turning circle and the second turning circle is a circle with the minimum turning radius of the autonomous mobile body. Thus, the shortest point-to-point path can be generated in consideration of the traveling performance of the autonomous mobile body.

In the path generating device, the autonomous mobile body may tow the cart. In this case, each of the first turning circle and the second turning circle is a circle with the minimum turning radius of the autonomous mobile body including the cart towed by the autonomous mobile body. Thus, the shortest point-to-point path can be generated in consideration of the traveling performance of the autonomous mobile body that tows the cart.

The path generating device may determine whether a current position of the autonomous mobile body is included in a suspension possible area that defines a position range, in which it is possible to plan that the movement path including the start point at a position at a time of stopping of the autonomous movable body by suspension of autonomous movement currently being executed at the current position and including the end point at the target position is within the specific area, when a command is issued to generate the movement path with a predetermined target position in the specific area as the end point during the autonomous movement in the specific area, may suspend the autonomous movement currently being executed when the current position of the autonomous mobile body is included in the suspension possible area, and may generate the movement path with a position where the stopping is made after the suspension of the autonomous movement currently being executed as the start point and the target position as the end point.

Thus, even when a command is issued to plan the movement path during the execution of the autonomous movement, it is possible to prevent the planned movement path from going out of the specific area as a result of planning the movement path from the position where the stopping is made by the suspension of the autonomous movement.

In the path generating device, the suspension possible area may be set as an area indicating a range of a position where the turning-circle included area can be within the specific area. The turning-circle included area includes the first turning circle settable at a position where the autonomous mobile body stops by suspending its movement while traveling straight at a maximum speed, the first turning circle settable at a position where the autonomous mobile body stops by suspending its movement while turning right at a maximum speed, and the first turning circle settable at a position where the autonomous mobile body stops by suspending its movement while turning left at a maximum speed. Thus, it is possible to more accurately determine whether the current position of the autonomous mobile body is a position suitable for suspending the autonomous movement and generating the movement path.

In the path generating device, the suspension possible area may be set for each attitude angle of the autonomous mobile body. In this case, the path generating device may select a suspension possible area corresponding to an attitude angle of the autonomous mobile body at the current position, and may determine whether a current position of the autonomous mobile body is included in the suspension possible area selected. Thus, it is possible to accurately determine whether the autonomous movement of the autonomous mobile body during the autonomous movement can be suspended and the point-to-point path that is within the specific area can be planned at an arbitrary attitude angle of the autonomous mobile body.

The path generating device may continue the autonomous movement currently being executed when the current position of the autonomous mobile body is not included in the suspension possible area. Thus, the autonomous mobile body can be moved to another position by autonomous movement and the autonomous movement can be suspended to attempt to generate a movement path from another position.

An autonomous mobile body according to still another aspect of a preferred embodiment of the present invention includes a main body, the path generating device described above, and a mover to move the main body along a movement path generated by the path generating device.

A point-to-point path that is within the specific area can be generated using the Dubins path for more combinations of start points and end points in a specific area.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a diagram illustrating a functional block configuration of a control unit.

FIG. 6 is a diagram illustrating an example of a path desired to be reproduced and traveled by the autonomous mobile body.

FIG. 14 is a diagram illustrating an example of a first turning circle with reference to an end point.

DETAILED DESCRIPTION OF THE PREFERRED EMBODIMENTS

1. First Preferred Embodiment

Figure 1:
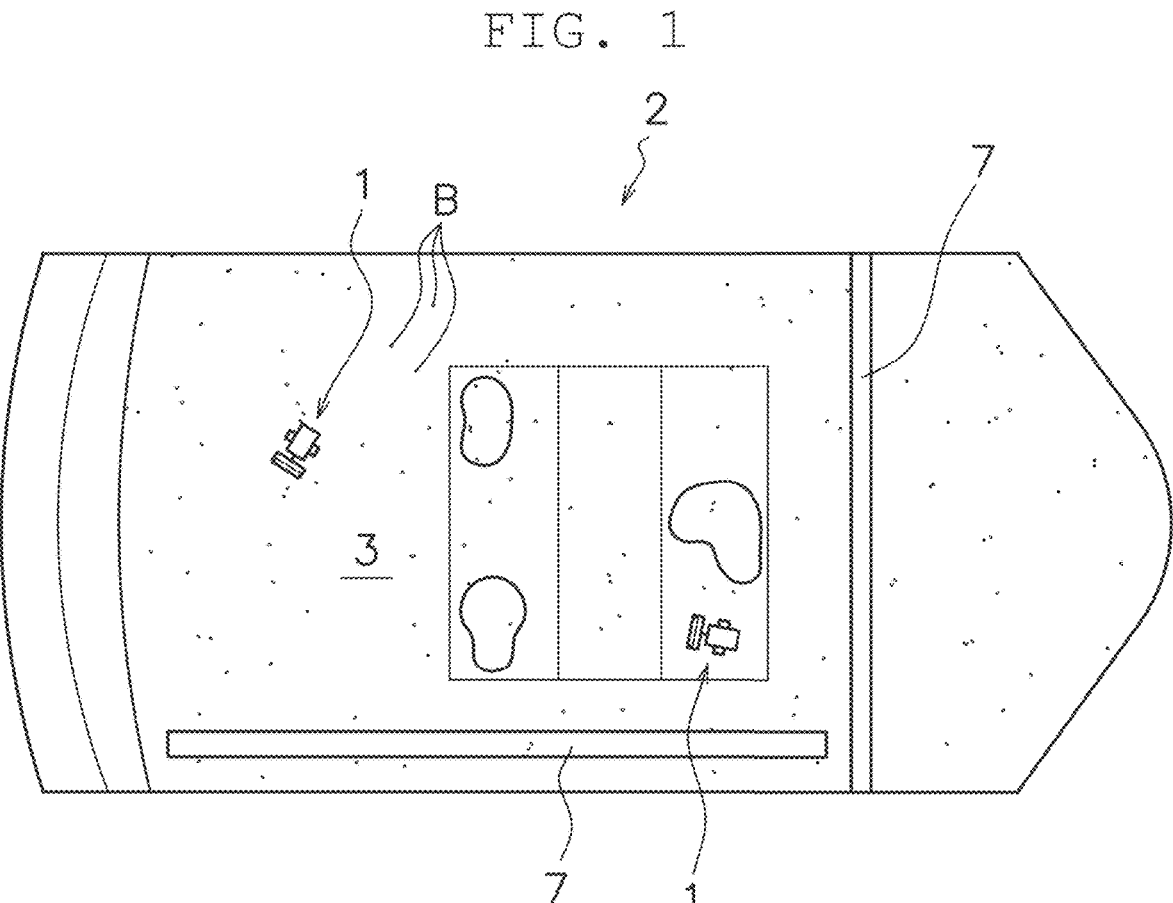
FIG. 1 is a schematic plan view of a driving range.
Figure 2:
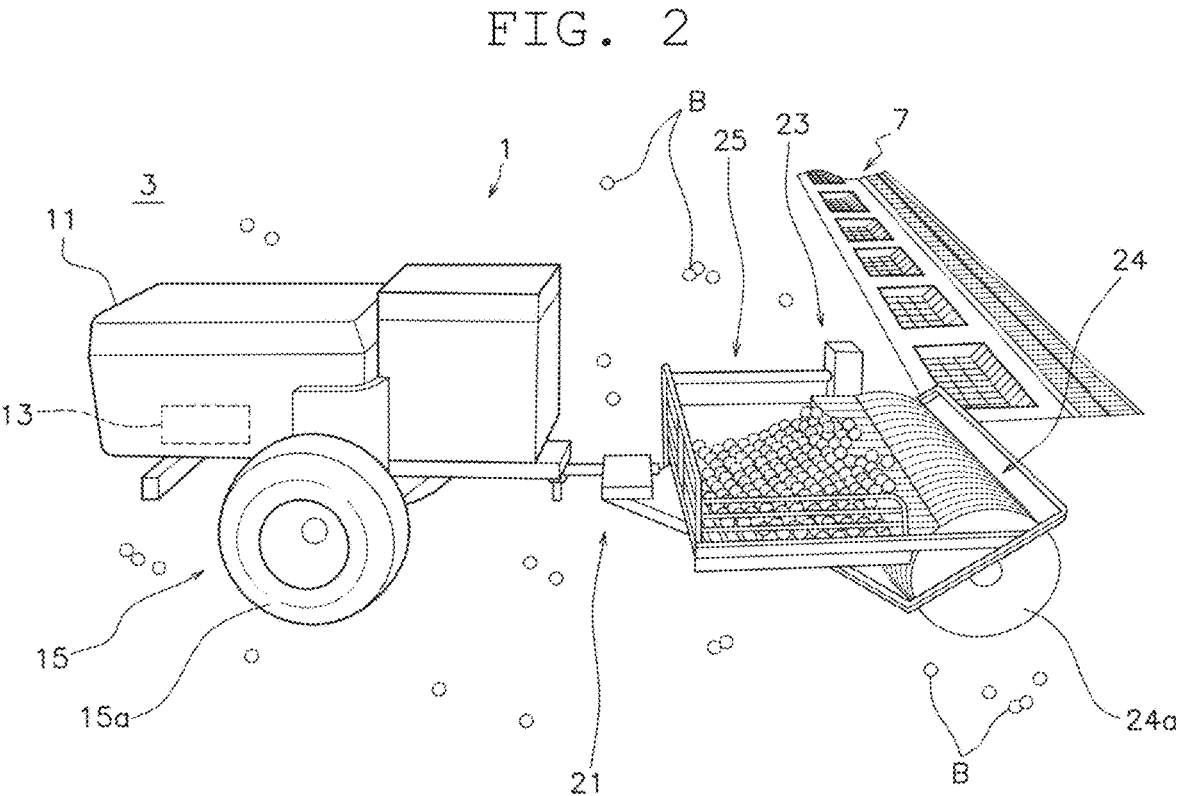
FIG. 2 is a schematic perspective view (part 1) of an autonomous mobile body.
Figure 3:
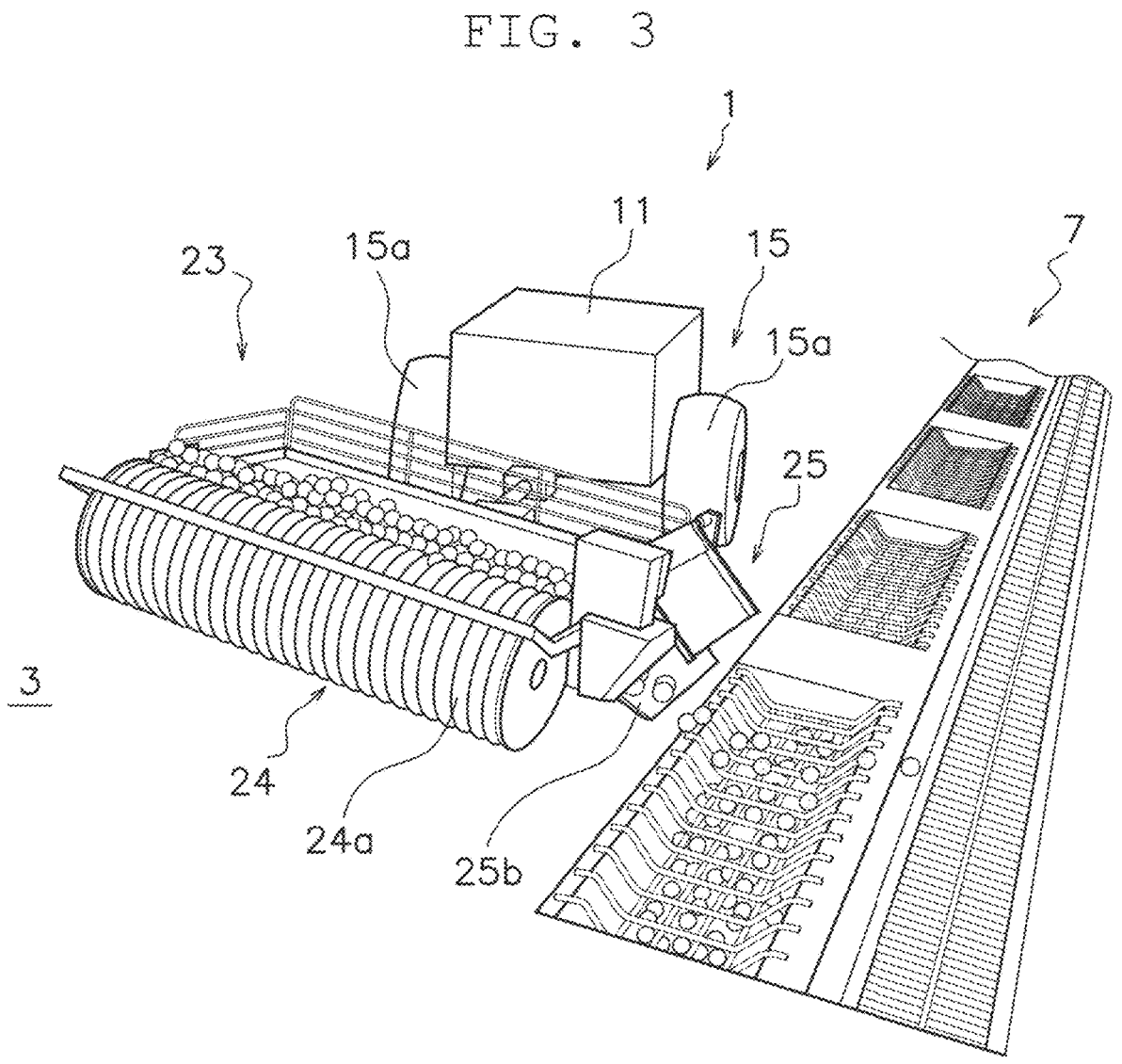
FIG. 3 is a schematic perspective view (part 2) of the autonomous mobile body.

Hereinafter, an autonomous mobile body 1 will be described with reference to FIGS. 1 to 3. FIG. 1 is a schematic plan view of a driving range. FIGS. 2 and 3 are schematic perspective views of the autonomous mobile body. The autonomous mobile body 1 according to the present preferred embodiment is a ball collecting and ejecting machine used in a driving range 2.

The driving range 2 has a ball scattered area 3 in which golf balls B are scattered and a ball ejection groove 7 in which the collected golf balls B are ejected. In the present preferred embodiment, the ball scattered area 3 is planted with grass turf. The ball ejection groove 7 is a groove for ejecting the golf balls B provided in the ball scattered area 3. The golf balls B ejected into the ball ejection groove 7 are sent to a collection pool (not illustrated).

The autonomous mobile body 1 collects the golf balls B scattered in the ball scattered area 3 while autonomously moving in the area (a ball collecting operation). The autonomous mobile body 1 autonomously moves from the ball scattered area 3 to the ball ejection groove 7 side and ejects the golf balls B collected in the ball scattered area 3 into the ball ejection groove 7 (a ball ejecting operation). That is, the autonomous mobile body 1 is a device that collects and ejects balls while performing reproductive traveling in the driving range 2.

The "reproductive traveling" described above is to autonomously move and reproduce a path generated based on information taught by an operator. The "reproductive traveling" includes, for example, "copy traveling" in which a path itself taught by the operator is reproduced by autonomous movement, "filling-in traveling" in which a path is reproduced by autonomous movement along a filling-in path planned to fill in a specific area taught by the operator in advance, and "point-to-point traveling" in which a point-to-point path planned to connect predetermined two points is reproduced by autonomous movement. The autonomous mobile body 1 autonomously moves continuously on a plurality of paths individually taught or planned for the "reproductive traveling".

Hereinafter, the configuration of the autonomous mobile body 1 will be described with reference to FIGS. 2 and 3. The autonomous mobile body 1 includes a main body 11 and a control unit 13 (an example of a path generating device). The main body 11 is a main body of the autonomous mobile body 1. The main body 11 is provided with a moving part (mover) 15. The moving part 15 is a device for moving the autonomous mobile body 1. The moving part 15 includes, for example, a wheel 15*a* and a traveling motor 15*b* (FIG. 4) that is provided in the main body 11 and rotates the wheel 15*a*.

The main body 11 is connected to a ball collecting and ejecting part 23 by a connecting structure 21. The ball collecting and ejecting part 23 is a cart towed by the autonomous mobile body 1 and collects and ejects the golf balls B. Specifically, the ball collecting and ejecting part 23 includes a ball collecting part 24 for collecting the golf balls B and a ball ejecting part 25 for ejecting the golf balls B. The ball collecting part 24 includes a pickup rotor 24a that rotates with the movement of the autonomous mobile body 1. Note that the ball collecting part 24 may be configured such that the pickup rotor 24a rotates by a ball collecting part motor (not illustrated). The ball ejecting part 25 includes a ball-ejecting-part motor 25a (FIG. 4) and a ball ejection gate 25b driven by the ball-ejecting-part motor 25a.

The control unit 13 is provided inside the main body 11 and is a computer system including a central processing unit (CPU), a storage device (a random-access memory (RAM), a read-only memory (ROM), a hard disk drive, a solid-state drive (SSD), etc.), various interfaces, and the like. The control unit 13 is configured or programmed to perform various controls related to the autonomous mobile body 1. Note that all or part of the various controls executed by the control unit 13 may be realized by a program executable by a computer system of the control unit 13. In this case, the program may be stored in the storage device. All or a part of the control unit 13 may be realized as a custom integrated circuit (IC) such as a system-on-chip (SoC).

Furthermore, the control unit 13 may include one computer system or may be including a plurality of computer systems. When the control unit 13 includes a plurality of computer systems, for example, functions realized by a plurality of functional blocks of the control unit 13 can be distributed and executed by the plurality of computer systems at an arbitrary ratio.

Figure 4:
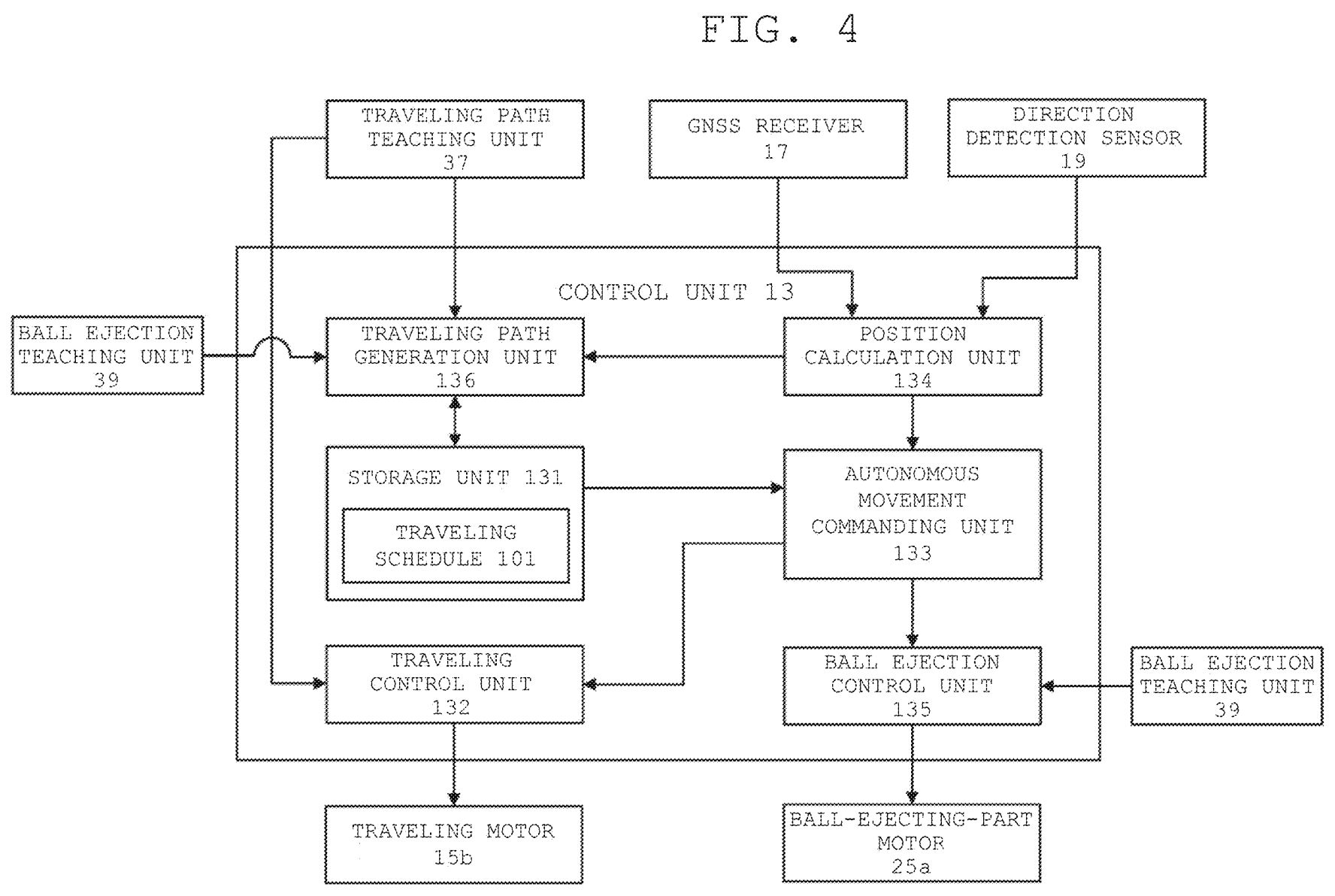

The autonomous mobile body 1 further includes various sensors and the like. Specifically, the autonomous mobile body 1 includes a global navigation satellite system (GNSS) receiver 17 (FIG. 4) and a direction detection sensor 19 (FIG. 4). The GNSS receiver 17 is provided in the main body 11 and acquires information (position information) regarding the current position of the autonomous mobile body 1 on the ground in the driving range 2. Hence the autonomous mobile body 1 can travel outdoors while grasping its self-position.

The direction detection sensor 19 is provided in the main body 11 and measures an orientation (a direction) of the autonomous mobile body 1 (the main body 11) in the driving range 2. The direction detection sensor 19 is, for example, a geomagnetic sensor that measures an orientation of geomagnetism at the position of the autonomous mobile body 1, a GNSS compass, or the like.

In another preferred embodiment, a pair of GNSS receivers 17 may be provided in the main body 11 to define the direction detection sensor 19. For example, the pair of GNSS receivers 17 is arranged side by side on a predetermined axis (e.g., an axis parallel to the straight traveling direction of the autonomous mobile body 1) of the main body 11, and the orientation (the direction) of the main body 11 in the driving range 2 can be calculated from two coordinate values (a combination of latitude and longitude) obtained from the pair of GNSS receivers 17 (a moving baseline method). By calculating the direction using the coordinates obtained by the GNSS receiver 17, the direction of the autonomous mobile body 1 can be easily measured (calculated) without the influence of surrounding magnetic body.

Furthermore, the direction of the autonomous mobile body 1 can also be calculated from, for example, changes in latitude and longitude measured by the GNSS receiver 17 before and after movement.

The ball collecting and ejecting part 23 may be provided with a ball storage amount detector (not illustrated). The storage amount detector measures the storage amount of the golf balls B stored in the ball collecting and ejecting part 23. When the storage amount of the golf balls B exceeds a predetermined threshold, the ball collecting and ejecting part 23 becomes ready to ejection balls. The storage amount detector is, for example, a weight sensor that measures the weight of the stored golf balls B or a photoelectric sensor that detects the upper surface of the stored golf balls B.

A functional block configuration of the control unit 13 will be described with reference to FIG. 4. FIG. 4 is a diagram illustrating a functional block configuration of a control unit. The control unit 13 includes a storage unit 131, a traveling control unit 132, an autonomous movement commanding unit 133, a position calculation unit 134, a ball ejection control unit 135, and a traveling path generation unit 136 as functional blocks.

The storage unit 131 is a part or all of the storage area of the storage device of the computer system of the control unit 13 and stores various types of information regarding the autonomous mobile body 1. Specifically, the storage unit 131 stores a traveling schedule 101. The traveling schedule 101 is data that stores a point group representing a path desired to be autonomously reproduced and traveled by the autonomous mobile body 1. In the present preferred embodiment, the traveling schedule 101 stores not only the path desired to be reproduced and traveled, but also data on at which timing the golf balls B collected by the ball collecting and ejecting part 23 are ejected.

The traveling control unit 132 controls the traveling motor 15b. The traveling control unit 132 receives an operation command from a traveling path teaching unit 37 and a movement command from the autonomous movement commanding unit 133. The traveling path teaching unit 37 is, for example, an operation input of the autonomous mobile body 1 such as a steering wheel or a remote controller. By the traveling control unit 132 inputting an operation command from the traveling path teaching unit 37, the autonomous mobile body 1 can move in accordance with the operation of the operator using the traveling path teaching unit 37.

The autonomous movement commanding unit 133 outputs a movement command for autonomously moving the autonomous mobile body 1 to the traveling control unit 132. Specifically, the autonomous movement commanding unit 133 calculates the driving amount of the traveling motor 15b based on the difference between a point to be a movement target among point groups included in the traveling schedule 101 and the position information of the autonomous mobile body 1 input from the position calculation unit 134, and outputs the driving amount to the traveling control unit 132 as a movement command. Further, the autonomous movement commanding unit 133 outputs a command (a ball ejection command) to eject the golf balls B from the ball collecting and ejecting part 23 to the ball ejection control unit 135 at a timing for ball ejection shown in the traveling schedule 101.

The position calculation unit 134 calculates the current position of the autonomous mobile body 1 in the driving range 2 based on the information acquired by the GNSS receiver 17. Specifically, the position calculation unit 134 measures the position of the current location obtained by real-time kinematic (RTK) positioning as a combination of latitude and longitude. In addition, it is also possible to use the position of the current location obtained by Centimeter Level Augmentation Service (CLAS). The position calculation unit 134 calculates the orientation (the direction) of the autonomous mobile body 1 based on a signal from the direction detection sensor 19.

As described above, the position calculation unit 134 calculates the latitude and longitude of the position where the autonomous mobile body 1 exists and as the position information of the autonomous mobile body 1, the orientation of the autonomous mobile body 1 at the position. Note that the position calculation unit 134 represents the orientation of the autonomous mobile body 1 as, for example, an angle that increases clockwise with reference to the north (0°).

The ball ejection control unit 135 drives the ball-ejecting-part motor 25*a* at a timing when an operation is performed on a ball ejection teaching unit 39 to cause the ball ejection gate 25*b* to operate, and ejects the golf balls B collected by the ball collecting and ejecting part 23. The ball ejection teaching unit 39 is, for example, an operation panel including a push button or the like.

The traveling path generation unit 136 generates a traveling schedule 101 and stores the traveling schedule in the storage unit 131. The traveling path generation unit 136 can generate, as the traveling schedule 101, a path obtained by combining a path taught by the operator (referred to as a copy-traveling path) and a path planned to fill in the specific area taught by the operator (referred to as a filling-in path). The traveling path generation unit 136 generates a point-to-point path (e.g., a path connecting the end point of the filling-in path and the start point of the copy-traveling path) connecting two points in the specific area by using a Dubins path. The generation of the traveling schedule 101 by the traveling path generation unit 136 will be described in detail later.

The traveling path generation unit 136 can reflect a timing at which the operation by the ball ejection teaching unit 39 is performed, that is, a timing at which the golf balls B are ejected from the ball collecting and ejecting part 23 in the traveling schedule 101. Specifically, for example, in the traveling schedule 101, the traveling path generation unit 136 can store the position of the autonomous mobile body 1 at the timing when the operation by the ball ejection teaching unit 39 is performed and/or a time at the timing when the operation by the ball ejection teaching unit 39 is performed (an elapsed time from the start of the autonomous movement), and the information indicating that the operation has been performed by the ball ejection teaching unit 39 in association with each other.

Hereinafter, a Dubins path used for generating a point-to-point path connecting two points in a specific area will be described. The Dubins path is a path that includes a turning circle CR1 including a start point ST of the point-to-point path on the circumference, a turning circle CR2 including an end point G on the circumference, and a tangent line TL or a turning circle CR3 in contact with the two turning circles CR1, CR2. Six types of Dubins paths illustrated in FIGS. 5A to 5F are generated with respect to a specific start point ST and an end point G, a specific orientation D1 (an attitude) of the autonomous mobile body 1 at the start point ST, and a specific orientation D2 of the autonomous mobile body 1 at the end point G. FIGS. 5A to 5F are diagrams illustrating examples of the generation of the Dubins path.

Figure 5A:
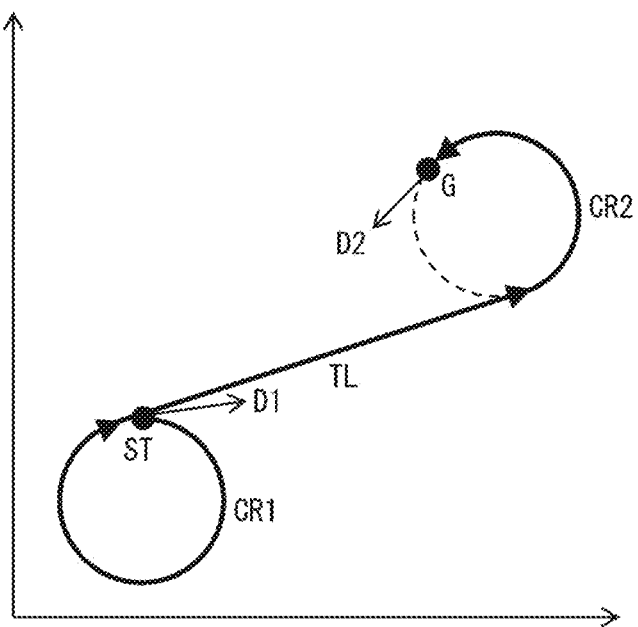
FIG. 5A is (part 1) illustrating a generation example of a Dubins path.

The Dubins path illustrated in FIG. 5A includes a clockwise turning circle CR1, a counterclockwise turning circle CR2, and a tangent line TL that is a straight line. This Dubins path is a path for moving clockwise along the turning circle CR1 from the start point ST to a contact point between the turning circle CR1 and the tangent line TL, thereafter moving along the tangent line TL from the contact point between the turning circle CR1 and the tangent line TL to a contact point between the turning circle CR2 and the tangent line TL, and further moving counterclockwise along the turning circle CR2 from the contact point between the turning circle CR2 and the tangent line TL to the end point G (a right-straight-left (RSL) path).

Figure 5B:
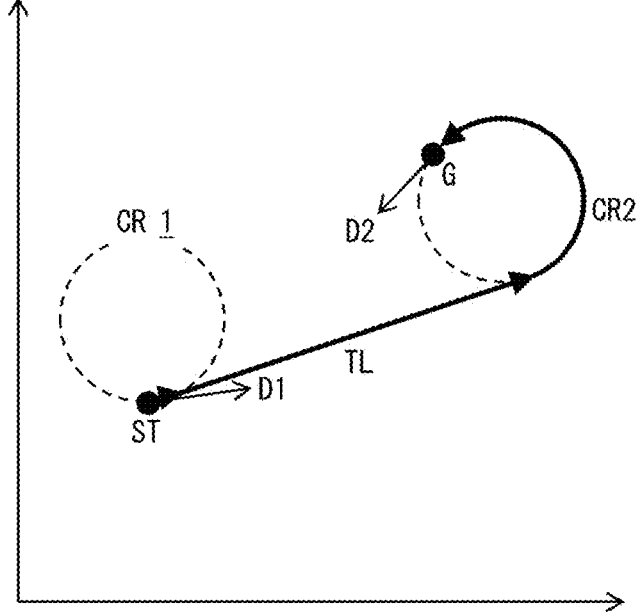
FIG. 5B is (part 2) illustrating a generation example of the Dubins path.

The Dubins path illustrated in FIG. 5B includes a counterclockwise turning circle CR1, a counterclockwise turning circle CR2, and a tangent line TL that is a straight line. The Dubins path is a path for moving counterclockwise along the turning circle CR1 from the start point ST to a contact point between the turning circle CR1 and the tangent line TL, thereafter moving along the tangent line TL from the contact point between the turning circle CR1 and the tangent line TL to a contact point between the turning circle CR2 and the tangent line TL, and further moving counterclockwise along the turning circle CR2 from the contact point between the turning circle CR2 and the tangent line TL to the end point G (a left-straight-left (LSL) path).

Figure 5C:
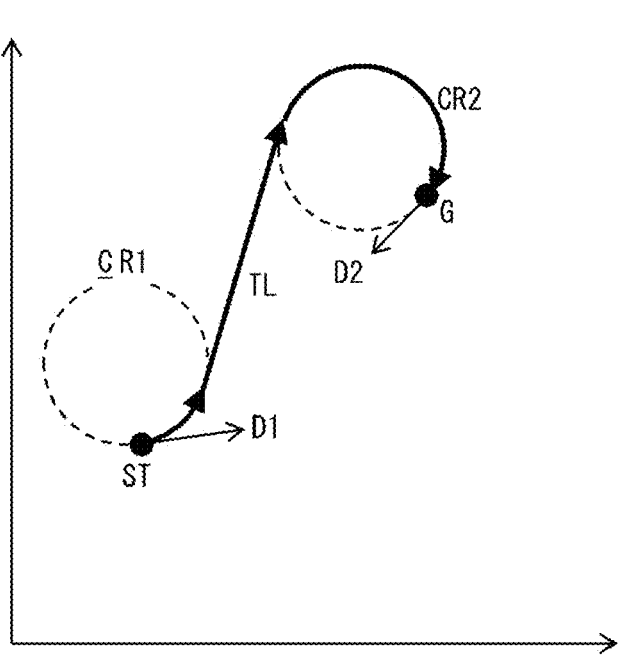
FIG. 5C is (Part 3) illustrating a generation example of the Dubins path.

The Dubins path illustrated in FIG. 5C includes a counterclockwise turning circle CR1, a clockwise turning circle CR2, and a tangent line TL that is a straight line. The Dubins path is a path for moving counterclockwise along the turning circle CR1 from the start point ST to a contact point between the turning circle CR1 and the tangent line TL, thereafter moving along the tangent line TL from the contact point between the turning circle CR1 and the tangent line TL to a contact point between the turning circle CR2 and the tangent line TL, and further moving clockwise along the turning circle CR2 from the contact point between the turning circle CR2 and the tangent line TL to the end point G (a left-straight-right (LSR) path).

Figure 5D:
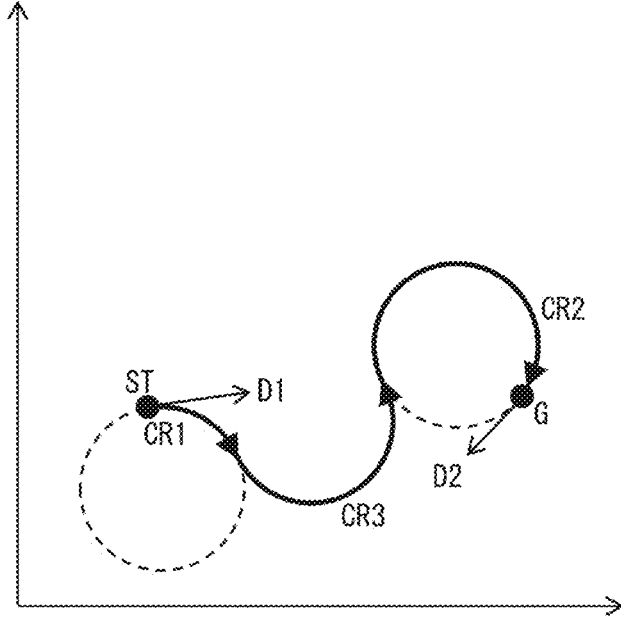
FIG. 5D is (Part 4) illustrating a generation example of the Dubins path.

The Dubins path illustrated in FIG. 5D includes a clockwise turning circle CR1, a clockwise turning circle CR2, and a counterclockwise turning circle CR3. This Dubins path is a path for moving clockwise along the turning circle CR1 from the start point ST to a contact point between the turning circle CR1 and the turning circle CR3, thereafter moving counterclockwise along the turning circle CR3 from the contact point between the turning circle CR1 and the turning circle CR3 to a contact point between the turning circle CR2 and the turning circle CR3, and further moving clockwise along the turning circle CR2 from the contact point between the turning circle CR2 and the turning circle CR3 to the end point G (a right-left-right (RLR) path).

Figure 5E:
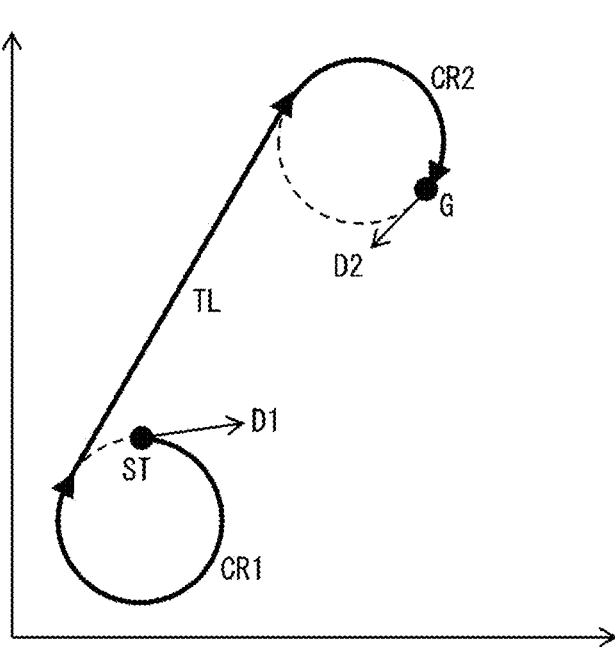
FIG. 5E is (Part 5) illustrating a generation example of the Dubins path.

The Dubins path illustrated in FIG. 5E includes a clockwise turning circle CR1, a clockwise turning circle CR2, and a tangent line TL that is a straight line. This Dubins path is a path for moving clockwise along the turning circle CR1 from the start point ST to a contact point between the turning circle CR1 and the tangent line TL, thereafter moving along the tangent line TL from the contact point between the turning circle CR1 and the tangent line TL to a contact point between the turning circle CR2 and the tangent line TL, and further moving clockwise along the turning circle CR2 from the contact point between the turning circle CR2 and the tangent line TL to the end point G (a right-straight-right (RSR) path).

Figure 5F:
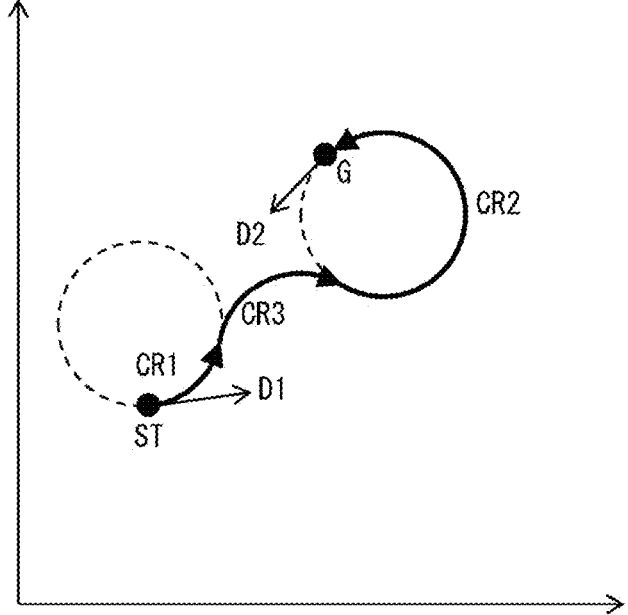
FIG. 5F is (Part 6) illustrating a generation example of the Dubins path.

The Dubins path illustrated in FIG. 5F includes a counterclockwise turning circle CR1, a counterclockwise turning circle CR2, and a clockwise turning circle CR3. The Dubins path is a path for moving counterclockwise along the turning circle CR1 from the start point ST to a contact point between the turning circle CR1 and the turning circle CR3, thereafter moving clockwise along the turning circle CR3 from the contact point between the turning circle CR1 and the turning circle CR3 to a contact point between the turning circle CR2 and the turning circle CR3, and further moving counterclockwise along the turning circle CR2 from the contact point between the turning circle CR2 and the turning circle CR3 to the end point G (a left-right-left (LRL) path).

Figure 6:
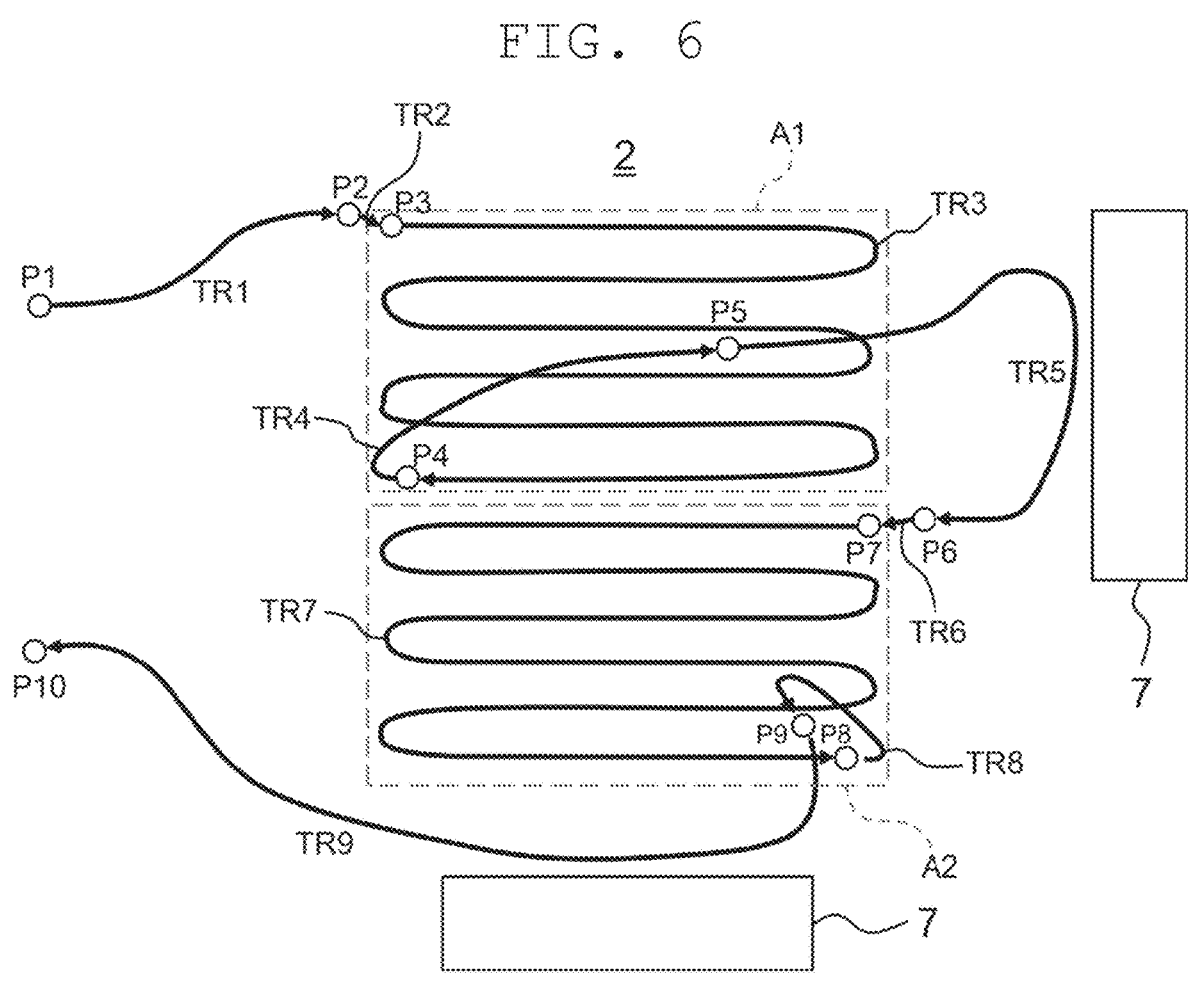

Hereinafter, an operation of generating the traveling schedule 101 will be described. In the following description, a case where a path as illustrated in FIG. 6 is generated as the traveling schedule 101 will be described as an example. FIG. 6 is a diagram illustrating an example of a path desired to be reproduced and traveled by the autonomous mobile body.

The path illustrated in FIG. 6 is a path with a position P1 of the driving range 2 as an autonomous movement start point and a position P10 as an autonomous movement end point. This path is including a movement path TR1 with the position P1 as a start point and a position P2 as an end point, a movement path TR2 with the position P2 as a start point and a position P3 as an end point, a movement path TR3 with the position P3 as a start point and a position P4 as an end point, a movement path TR4 with the position P4 as a start point and a position P5 as an end point, a movement path TR5 with the position P5 as a start point and a position P6 as an end point, a movement path TR6 with the position P6 as a start point and a position P7 as an end point, a movement path TR7 with the position P7 as a start point and a position P8 as an end point, a movement path TR8 with the position P8 as a start point and a position P9 as an end point, and a movement path TR9 with the position P9 as a start point and a position P10 as an end point.

Among the movement paths TR1 to TR9, the movement paths TR1, TR5, TR9 are copy-traveling paths. The movement paths TR5, TR9 are paths for ejecting the golf balls B collected in the specific areas A1, A2, respectively, and pass through the ball ejection groove 7 side. The movement path TR1 is a path from the autonomous movement start position (the position P1) toward the specific area A1. The movement path TR9 is a path toward the autonomous movement end point (the position P10) after the ejection of the golf balls B into the ball ejection groove 7.

The movement paths TR3, TR7 are filling-in paths for filling in the specific areas A1, A2, respectively. During the movement along the movement paths TR3, TR7, the autonomous mobile body 1 collects the golf balls B scattered on the driving range 2 (the ball scattered area 3).

The movement path TR4 is a point-to-point path that connects the end point (the position P4) of the movement path TR3, which is a filling-in path, and the start point (the position P5) of the movement path TR5, which is a copy-traveling path. The movement path TR4 is generated so as to be held within the specific area A1 in order to avoid interference with an obstacle or the like outside the specific area A1. The movement path TR8 is a point-to-point path that connects the end point (the position P8) of the movement path TR7, which is a filling-in path, and the start point (the position P9) of the movement path TR9, which is a copy-traveling path. The movement path TR8 is generated so as to be held within the specific area A2 in order to avoid interference with an obstacle or the like outside the specific area A2.

The movement path TR2 is a point-to-point path that connects the end point (the position P2) of the movement path TR1, which is a copy-traveling path, and the start point (the position P3) of the movement path TR3, which is a filling-in path.

Figure 7:
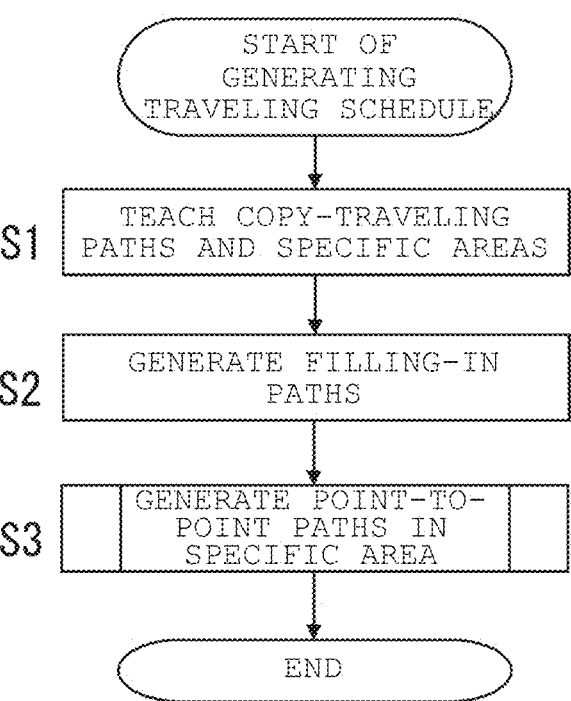
FIG. 7 is a flowchart illustrating an operation of generating a traveling schedule.

An operation of generating the path illustrated in FIG. 6 as the traveling schedule 101 will be described with reference to FIG. 7. FIG. 7 is a flowchart illustrating the operation of generating the traveling schedule. First, in step S1, the movement paths TR1, TR5, TR9, which are copy-traveling paths, and the specific areas A1, A2 are generated in accordance with the operator's teaching.

Specifically, the operator operates the traveling path teaching unit 37 to move the autonomous mobile body 1 in the order of the movement path TR1, the outer periphery of the specific area A1, the movement path TR5, the outer periphery of the specific area A2, and the movement path TR9. During the movement of the autonomous mobile body 1 by the operation of the operator, the traveling path generation unit 136 acquires position information calculated by the position calculation unit 134 every predetermined time period (e.g., the control cycle of the control unit 13). Thus, the movement path TR1, the outer periphery of the specific area A1, the movement path TR5, the outer periphery of the specific area A2, and the movement path TR9 can be generated as a path including a plurality of pieces of position information (i.e., the coordinates of the self-position of the autonomous mobile body 1 and the orientation (the attitude) of the autonomous mobile body 1 at the self-position) as a point group.

The traveling path generation unit 136 stores, into the traveling schedule 101, a point group representing the movement paths TR1, TR5, TR9, which are copy-traveling paths, among the paths generated in step S1. At this time, a time for passing through each point is associated with each point group of the traveling schedule 101. Meanwhile, a point group representing the outer peripheries of the specific areas A1, A2 is stored into the storage unit 131 in order to generate the filling-in path.

Note that the teaching of the movement path and the outer peripheries of the specific areas in step S1 may not be performed in the movement order of the paths illustrated in FIG. 6 as described above. The order of teaching of the movement path and the outer peripheries of the specific areas can be appropriately determined in consideration of the efficiency of teaching and the like.

Next, in step S2, the traveling path generation unit 136 generates filling-in paths (the movement path TR3, TR7) in the respective specific areas A1, A2. The traveling path generation unit 136 can generate a filling-in path including a plurality of pieces of position information as a point group by executing a known filling-in path generation algorithm. The traveling path generation unit 136 stores the point group representing the filling-in path into the traveling schedule 101 in association with a time for passing through each point. The traveling path generation unit 136 generates the movement path TR2 connecting the movement path TR1 and the movement path TR3 and the movement path TR6 connecting the movement path TR5 and the movement path TR7 and stores the generated traveling paths into the traveling schedule 101.

Figure 8:
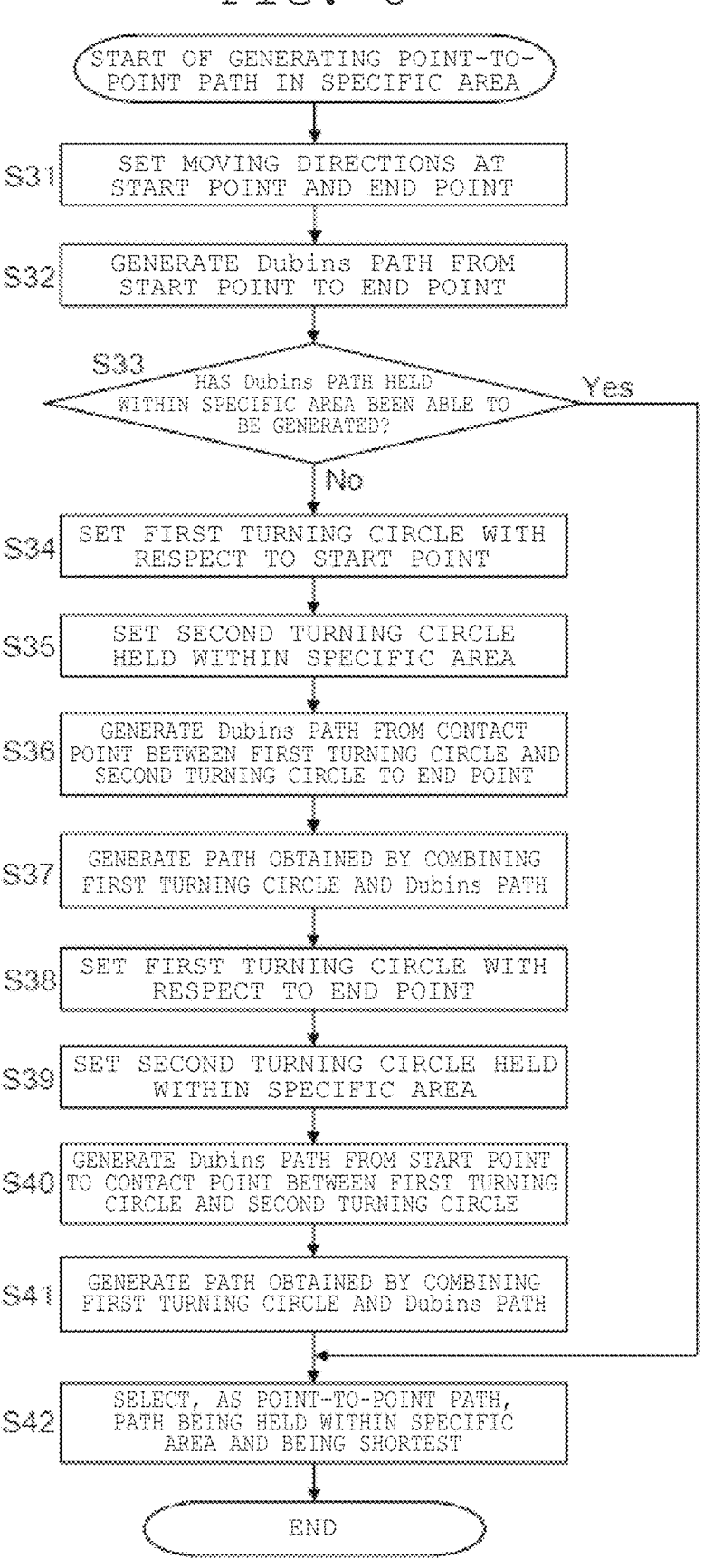
FIG. 8 is a flowchart illustrating an operation of generating a point-to-point path in a specific area.

Thereafter, in step S3, the traveling path generation unit 136 generates point-to-point paths (the movement paths TR4, TR8) connecting two points in the specific areas A1, A2. As described above, the movement paths TR4, TR8, which are the point-to-point paths, are generated so as to be held within the specific areas A1, A2. Specifically, the traveling path generation unit 136 generates the movement paths TR4, TR8, which are point-to-point paths, in accordance with a flowchart of FIG. 8 described below. FIG. 8 is a flowchart illustrating an operation of generating the point-to-point path in the specific area. In the following description, a case where the movement path TR8 having the position P8 in the specific area A2 as a start point and the position P9 as an end point is generated will be taken as an example. The movement path TR4 in the specific area A1 can also be generated in the same manner as the movement path TR8.

Figure 9:
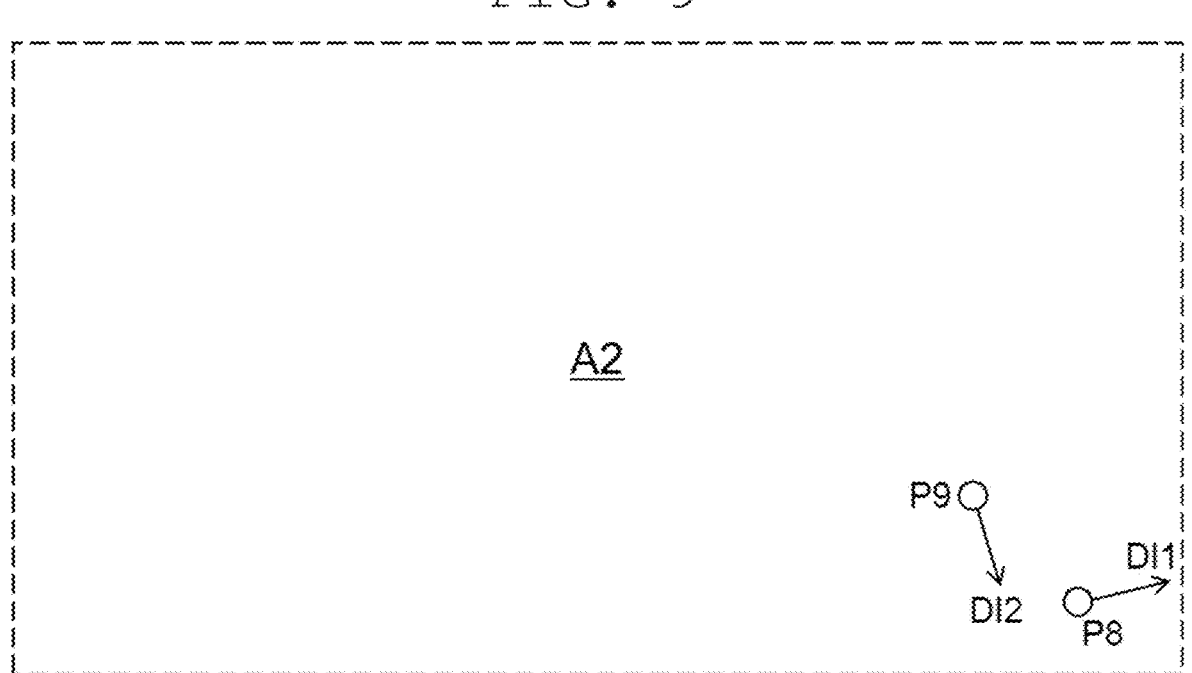
FIG. 9 is a diagram illustrating examples of a moving direction set at a start point and an end point of a movement path.

First, in step S31, the traveling path generation unit 136 sets moving directions at the position P8 serving as the start point of the movement path TR8 and the position P9 serving as the end point. For example, the orientations of the autonomous mobile body 1 at the position P8 and the position P9 are set as the moving directions at the position P8 and the position P9, respectively. Note that the orientations of the autonomous mobile body 1 at the position P8 and the position P9 are determined when the copy-traveling paths and the filling-in paths are generated in steps S1, S2 described above. For example, as illustrated in FIG. 9, a moving direction DI1 is set at the position P8, and a moving direction DI2 is set at the position P9. FIG. 9 is a diagram illustrating an example of the moving directions set at the start point and the end point of the movement path.

Next, in step S32, the traveling path generation unit 136 generates a Dubins path from the position P8 to the position P9. In step S32, the turning circle of the Dubins path has the minimum turning radius with which the autonomous mobile body 1 can turn in a state where the ball collecting and ejecting part 23 is connected thereto.

Thereafter, the traveling path generation unit 136 determines whether any of Dubins paths generated in step S33 is held within the specific area A2. When any of the Dubins paths generated in step S32 is held within the specific area A2 ("Yes" in step S33), the operation of generating the traveling schedule 101 proceeds to step S42. In step S42, the traveling path generation unit 136 selects, as the movement path TR8, the shortest one of the Dubins paths that are held within the specific area A2.

On the other hand, when no Dubins path generated in step S32 is held within the specific area A2 ("No" in step S33), the traveling path generation unit 136 generates the movement path TR8 by using another path generation algorithm. Specifically, the movement path TR8 is generated as follows.

First, in step S34, the traveling path generation unit 136 sets a first turning circle C1 having a contact point at the position P8 being the start point of the movement path TR8 and having a turning direction in the moving direction DI1. The first turning circle C1 is set so as to be tangent to a straight line extending from the position P8 in the moving direction DI1 at the position P8. In consideration of a traveling ability (a turning ability) of the autonomous mobile body 1, the first turning circle C1 is set to have the minimum turning radius with which the autonomous mobile body 1 can turn in a state where the ball collecting and ejecting part 23 is connected thereto.

In step S34, a clockwise turning circle and a counterclockwise turning circle, which are tangent at the position P8, are considered as the first turning circle C1. Therefore, when one of the two turning circles having different turning directions is held within the specific area A2, the traveling path generation unit 136 sets the turning circle that is held within in the specific area A2 as the first turning circle C1 and determines that a path from the position P8 to the position P9 can be planned. On the other hand, when neither of the two first turning circles is included in the specific area A2, it is determined that a path from the position P8 to the position P9 cannot be planned.

Figure 10:
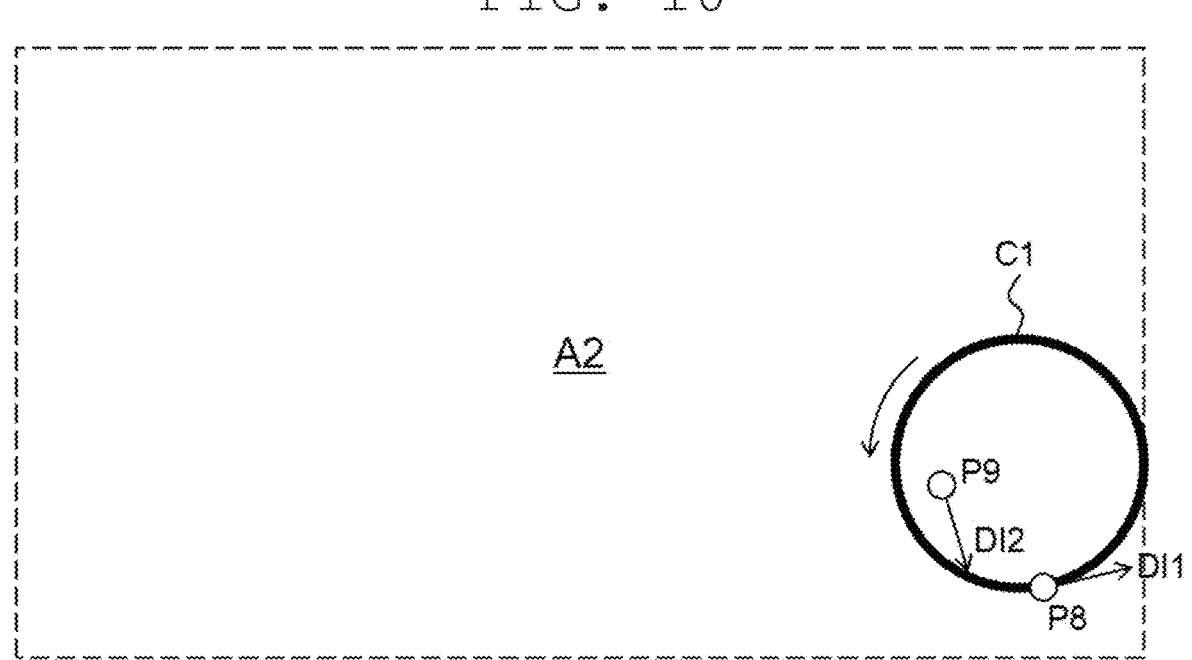
FIG. 10 is a diagram illustrating an example of a first turning circle with reference to a start point.

For the position P8 and the moving direction DI1 illustrated in FIG. 9, for example, a first turning circle C1 as illustrated in FIG. 10 can be set, and a path from the position P8 to the position P9 can be planned. The first turning circle C1 in FIG. 10 is a counterclockwise circle. FIG. 10 is a diagram illustrating an example of the first turning circle with reference to the start point.

Figure 11:
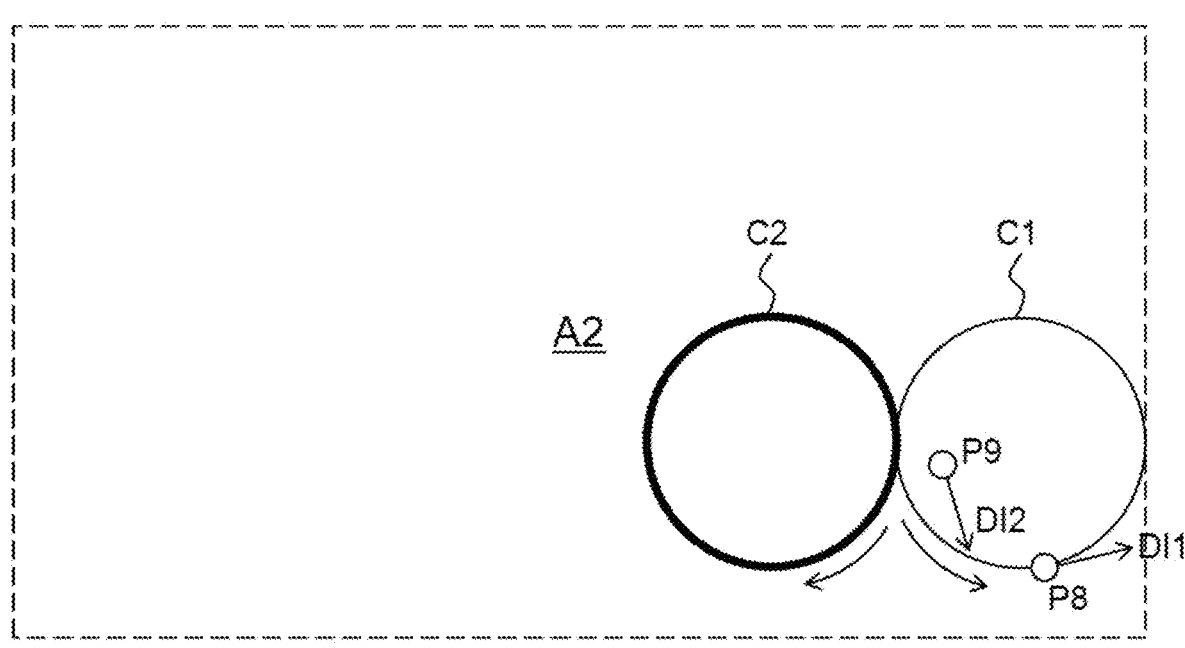
FIG. 11 is a diagram illustrating an example of a second turning circle tangent to the first turning circle with reference to the start point.

After setting the first turning circle C1, in step S35, the traveling path generation unit 136 sets a second turning circle C2 that is held within the specific area A2 and is tangent to the first turning circle C1. Similarly to the first turning circle C1, the second turning circle C2 is also set so as to have the minimum turning radius with which the autonomous mobile body 1 can turn in a state where the ball collecting and ejecting part 23 is connected thereto. Meanwhile, the second turning circle C2 rotates in a direction opposite to the first turning circle C1. For the first turning circle C1 illustrated in FIG. 10, for example, a second turning circle C2 as illustrated in FIG. 11 is set. Since the first turning circle C1 illustrated in FIG. 10 is counterclockwise, the second turning circle C2 illustrated in FIG. 11 is clockwise. FIG. 11 is a diagram illustrating an example of the second turning circle tangent to the first turning circle with reference to the start point.

Figure 12:
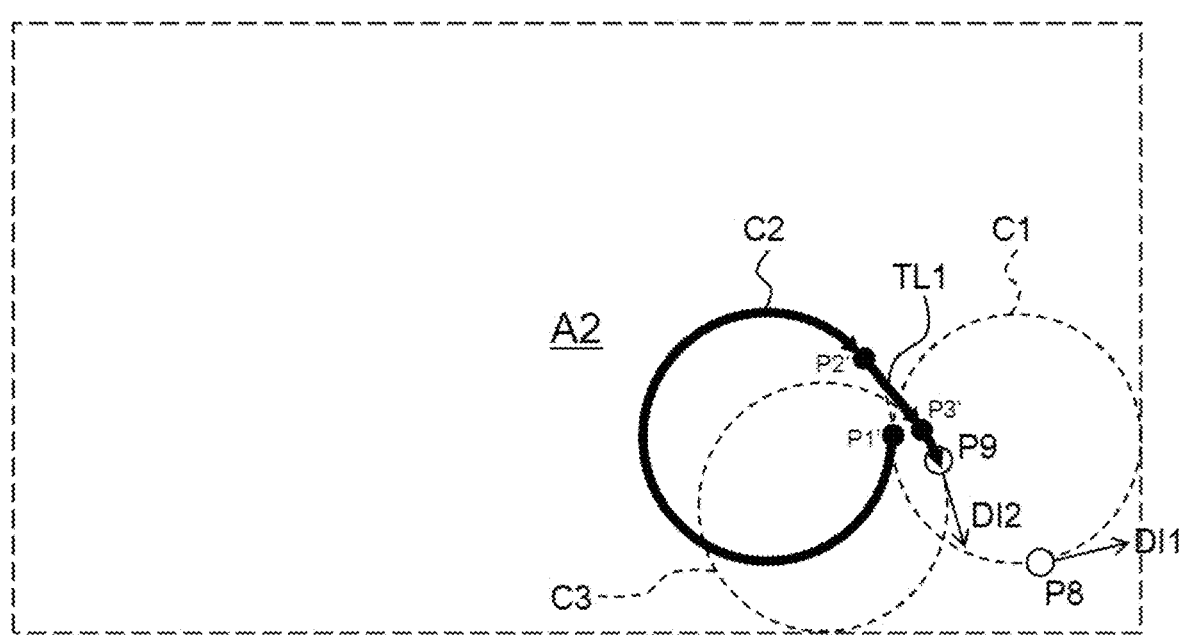
FIG. 12 is a diagram illustrating an example of a Dubins path generated for the second turning circle in FIG. 11.

After setting the second turning circle C2, in step S36, the traveling path generation unit 136 generates a Dubins path with a contact point P1' between the first turning circle C1 and the second turning circle C2 as a start point and the position P9 as an end point. For the second turning circle C2 illustrated in FIG. 11, a Dubins path as indicated by a thick line in FIG. 12 is generated. FIG. 12 is a diagram illustrating an example of the Dubins path generated for the second turning circle in FIG. 11.

As illustrated in FIG. 12, the Dubins path generated in step S36 is a so-called RSR path including the clockwise second turning circle C2, a clockwise third turning circle C3, and a tangent line TL1 between the second turning circle C2 and the third turning circle C3. The third turning circle C3 is a circle that includes the position P9 on the circumference and rotates from the position P9 in the moving direction DI2. The third turning circle C3 is tangent to a straight line extending from the position P9 in the moving direction DI2 at the position P9. Further, similarly to the first turning circle C1 and the second turning circle C2, the third turning circle C3 has the minimum turning radius with which the autonomous mobile body 1 can turn in a state where the ball collecting and ejecting part 23 is connected thereto.

Figure 13:
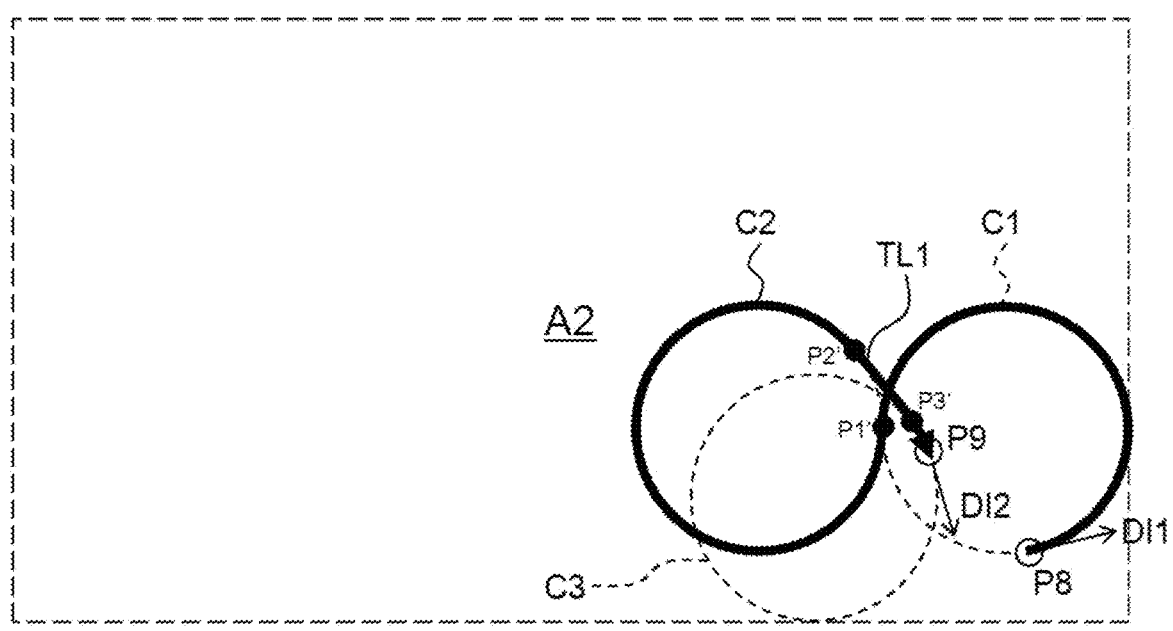
FIG. 13 is a diagram illustrating an example of a movement path candidate including the first turning circle and the Dubins path.

After generating the Dubins path, in step S37, the traveling path generation unit 136 generates, as a candidate for the movement path TR8, a path obtained by combining the first turning circle C1 and the Dubins path generated in step S36. Specifically, as illustrated in FIG. 13, a path for moving counterclockwise along the first turning circle C1 from the position P8 to the contact point P1' and the Dubins path generated in step S36 are connected at the contact point P1'. FIG. 13 is a diagram illustrating an example of the movement path candidate including the first turning circle and the Dubins path.

By executing the above step S37, as one of the candidates of the movement path TR8, as illustrated in FIG. 13, a path is generated for moving counterclockwise along the first turning circle C1 from the position P8 to the contact point P1', moving clockwise along the second turning circle C2 from the contact point P1' to a contact point P2' of the second turning circle C2 and the tangent line TL1, moving along the tangent line TL1 from the contact point P2' to a contact point P3' of the third turning circle C3 and the tangent line TL1, and moving clockwise along the third turning circle C3 from the contact point P3' to the position P9.

The point-to-point path connecting the position P8 and the position P9 may be generated not only when the first turning circle C1 starting from the position P8 is set as a counterclockwise turning circle but also when the first turning circle C1 is set as a clockwise turning circle. Therefore, after setting the counterclockwise first turning circle C1 in step S34 and executing steps S35 to S37 to generate a point-to-point path by the counterclockwise first turning circle C1, the traveling path generation unit 136 returns to step S34, sets the clockwise first turning circle C1, and executes steps S35 to S37 to generate a point-to-point path by the clockwise first turning circle C1. Conversely, the clockwise first turning circle C1 may be set to generate the point-to-point path using the Dubins path, and thereafter, the counterclockwise first turning circle C1 may be set to generate the point-to-point path using the Dubins path.

After the first turning circle C1 is set with reference to the position P8 and the candidate for the movement path TR8 is generated by executing steps S34 to S37, the first turning circle C1 is set with reference to the position P9 that is the end point of the movement path TR8 to generate the candidate for the movement path TR8.

Figure 14:
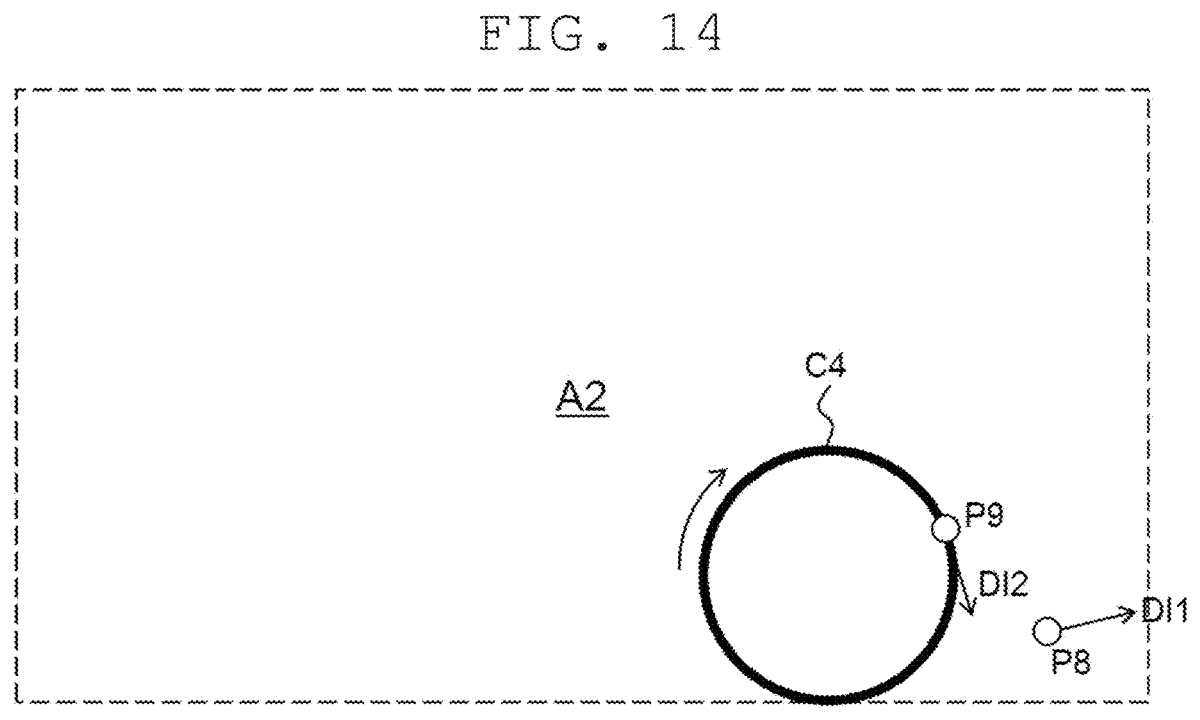

In step S38, the traveling path generation unit 136 sets the first turning circle C4 having a contact point at the position P9 being the end point of the movement path TR8 and having a turning direction in the moving direction DI2. For the position P9 and the moving direction DI2 illustrated in FIG. 9, for example, a first turning circle C4 as illustrated in FIG. 14 is set. The first turning circle C4 in FIG. 14 is a clockwise circle. FIG. 14 is a diagram illustrating an example of a first turning circle with reference to an end point.

Figure 15:
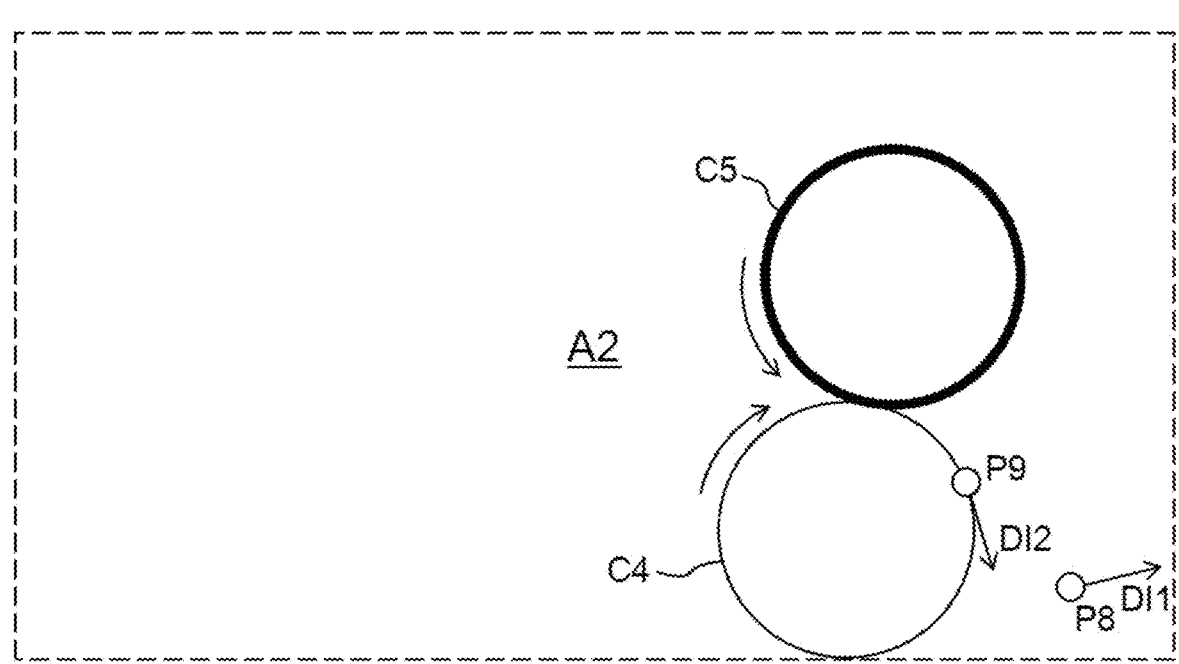
FIG. 15 is a diagram illustrating an example of a second turning circle tangent to the first turning circle with reference to the end point.

After setting the first turning circle C4, in step S39, the traveling path generation unit 136 sets a second turning circle C5 that is held within the specific area A2 and is tangent to the first turning circle C4. For the first turning circle C4 illustrated in FIG. 14, for example, a second turning circle C5 as illustrated in FIG. 15 is set. Since the first turning circle C1 illustrated in FIG. 14 is clockwise, the second turning circle C5 illustrated in FIG. 15 is counterclockwise. FIG. 15 is a diagram illustrating an example of the second turning circle tangent to the first turning circle with reference to the end point.

Figure 16:
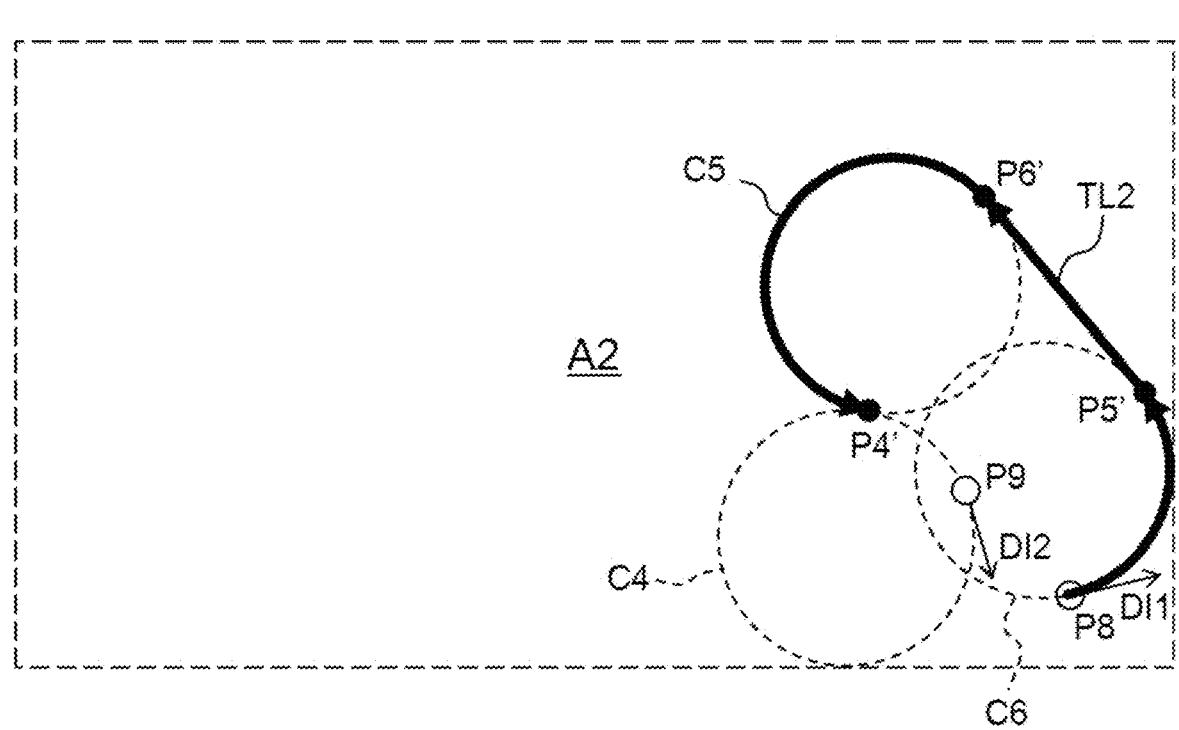
FIG. 16 is a diagram illustrating an example of a Dubins path generated for the second turning circle in FIG. 15.

After setting the second turning circle C5, in step S40, the traveling path generation unit 136 generates a Dubins path with the position P8 as a start point and a contact point P4' between the first turning circle C4 and the second turning circle C5 as a temporary end point. For the second turning circle C5 illustrated in FIG. 15, a Dubins path as indicated by a thick line in FIG. 16 is generated. FIG. 16 is a diagram illustrating an example of the Dubins path generated for the second turning circle in FIG. 15.

As illustrated in FIG. 16, the Dubins path generated in step S40 is a so-called LSL path including the counterclockwise second turning circle C5, a counterclockwise third turning circle C6, and a tangent line TL2 between the second turning circle C5 and the third turning circle C6. The third turning circle C6 is a circle that includes the position P8 on the circumference and rotates from the position P8 in the moving direction DI1. The third turning circle C6 is tangent to a straight line extending from the position P8 in the moving direction DI1 at the position P9.

Figure 17:
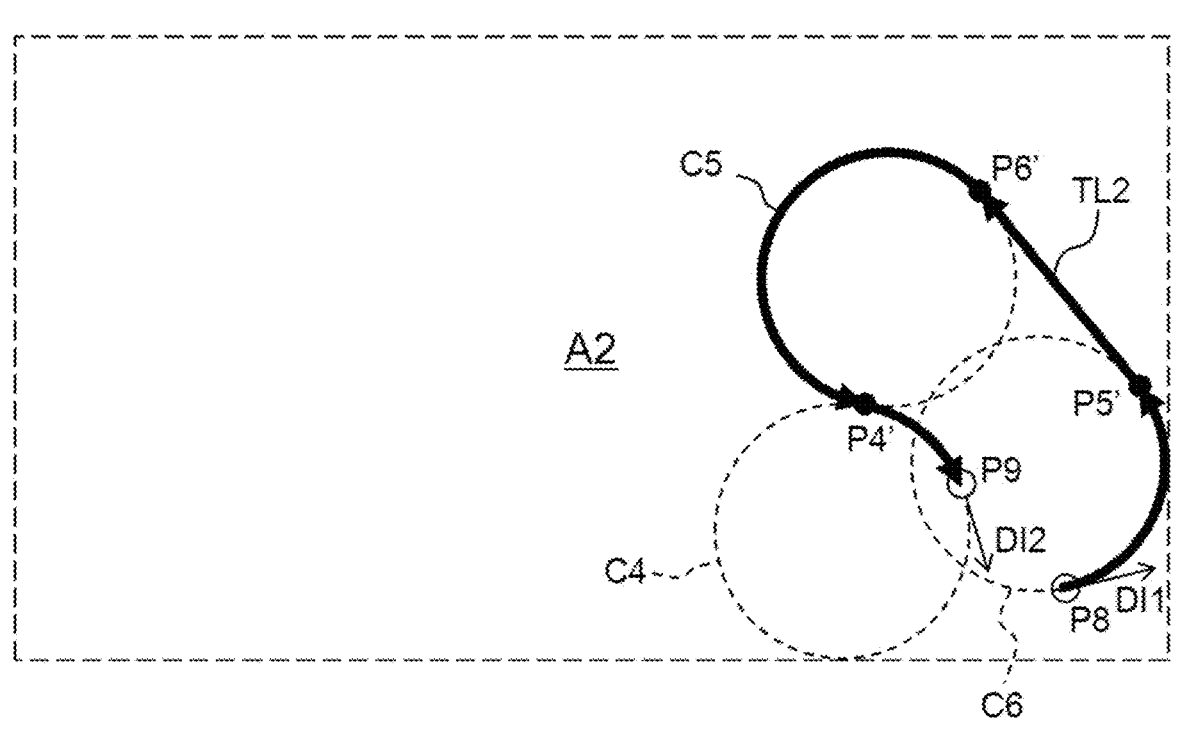
FIG. 17 is a view illustrating another example of the movement path candidate including the first turning circle and the Dubins path.

After generating the Dubins path, in step S41, traveling path generation unit 136 generates a path obtained by combining the first turning circle C4 and the Dubins path generated in step S40 as another candidate for the movement path TR8. Specifically, as illustrated in FIG. 17, a path for moving clockwise from the contact point P4' to the position P9 along the first turning circle C4 and the Dubins path generated in step S40 are connected at the contact point P4'. FIG. 17 is a view illustrating another example of the movement path candidate including the first turning circle and the Dubins path.

By executing the above step S41, as another candidate of the movement path TR8, as illustrated in FIG. 17, a path is generated for moving counterclockwise along the third turning circle C6 from the position P8 to a contact point P5' between the third turning circle C6 and the tangent line TL2, moving along the tangent line TL2 from the contact point P5' to a contact point P6' between the second turning circle C5 and the tangent line TL2, moving counterclockwise along the second turning circle C5 from the contact point P6' to the contact point P4', and moving clockwise along the first turning circle C4 from the contact point P4' to the position P9.

Even at the time of execution of steps S38 to S41, after setting the clockwise first turning circle C4 in step S38 and executing steps S39 to S41 to generate a point-to-point path by the clockwise first turning circle C4, the traveling path generation unit 136 returns to step S38, sets the counterclockwise first turning circle C4, and executes steps S39 to S41 to generate a point-to-point path by the counterclockwise first turning circle C4. Conversely, the counterclockwise first turning circle C4 may be set to generate the point-to-point path using the Dubins path, and thereafter, the clockwise first turning circle C4 may be set to generate the point-to-point path using the Dubins path.

There are a large number of candidates for the movement path TR8 generated by executing the above steps S34 to S41 depending on not only the two paths illustrated in FIGS. 13 and 17 but also the setting states of the first turning circles C1, C4 and the second turning circles C2, C5, the type of the Dubins path generated for each of the second turning circles C2, C5, and the like.

Therefore, in step S42, the traveling path generation unit 136 selects, as the movement path TR8, a candidate in which all the paths are held within the specific area A1 and the moving distance is the shortest among the generated candidates of the movement path TR8. Thereafter, the traveling path generation unit 136 converts the selected movement path TR8 into a point group and stores a time for passing through each point of the movement path TR8 into the traveling schedule 101 in association with the point group.

In the method for generating the point-to-point path in the specific area according to the present preferred embodiment, each of the first turning circles C1, C4 with the position P8 being the start point or the position P9 being the end point of the point-to-point path as the contact point is set before the generation of the Dubins path. The turning directions of the first turning circles C1, C4 are determined by the moving directions set at the positions P8, P9. Thereafter, each of the second turning circles C2, C5 that becomes a part of the Dubins path is set. By setting the first turning circles C1, C4 before the generation of the Dubins path and then setting the second turning circles C2, C5, it is possible to ensure an area necessary for generating the Dubins path in the specific areas A1, A2. As a result, for more combinations of start points and end points in the specific areas A1, A2, a point-to-point path that is held within the specific area can be generated using the Dubins path.

In order to confirm the above effect, a start point and an end point were set at various positions in a small specific area, various moving directions were set at the respective start points and end points, a first turning circle and a Dubins path were combined to generate a point-to-point path, and how well an appropriate point-to-point path that is held within the specific area could be generated was compared with a case where a point-to-point path was generated only by a Dubins path. As a result, when the first turning circle and the Dubins path were combined, it was possible to generate an appropriate point-to-point path for most combinations of the start point and the end point except for a start point and an end point extremely close to the outer periphery of the small specific area. On the other hand, when a point-to-point path was generated only by the Dubins path, an appropriate point-to-point path could not be generated at a start point and an end point relatively distant from the outer periphery of the specific area. That is, even when a point-to-point path that is held within a small specific area cannot be generated only by the Dubins path, a point-to-point path that is held within the specific area can be generated when the first turning circle and the Dubins path are combined.

The method for generating a movement path by combining the first turning circle and the Dubins path can also be applied to a case where it is difficult to move backward and the turning radius at the time of turning is limited, as in the case of the autonomous mobile body 1 (the ball collecting and ejecting machine) of the present preferred embodiment. That is, the method for generating a movement path by combining the first turning circle and the Dubins path does not impair the advantages of the Dubins path.

Further, in the present preferred embodiment, the first turning circles C1, C4 and the second turning circles C2, C5 are tangent to each other. This eliminates the need for paths connecting the first turning circles C1, C4 and the second turning circles C2, C5, so that a shorter point-to-point path can be generated.

Figure 18:
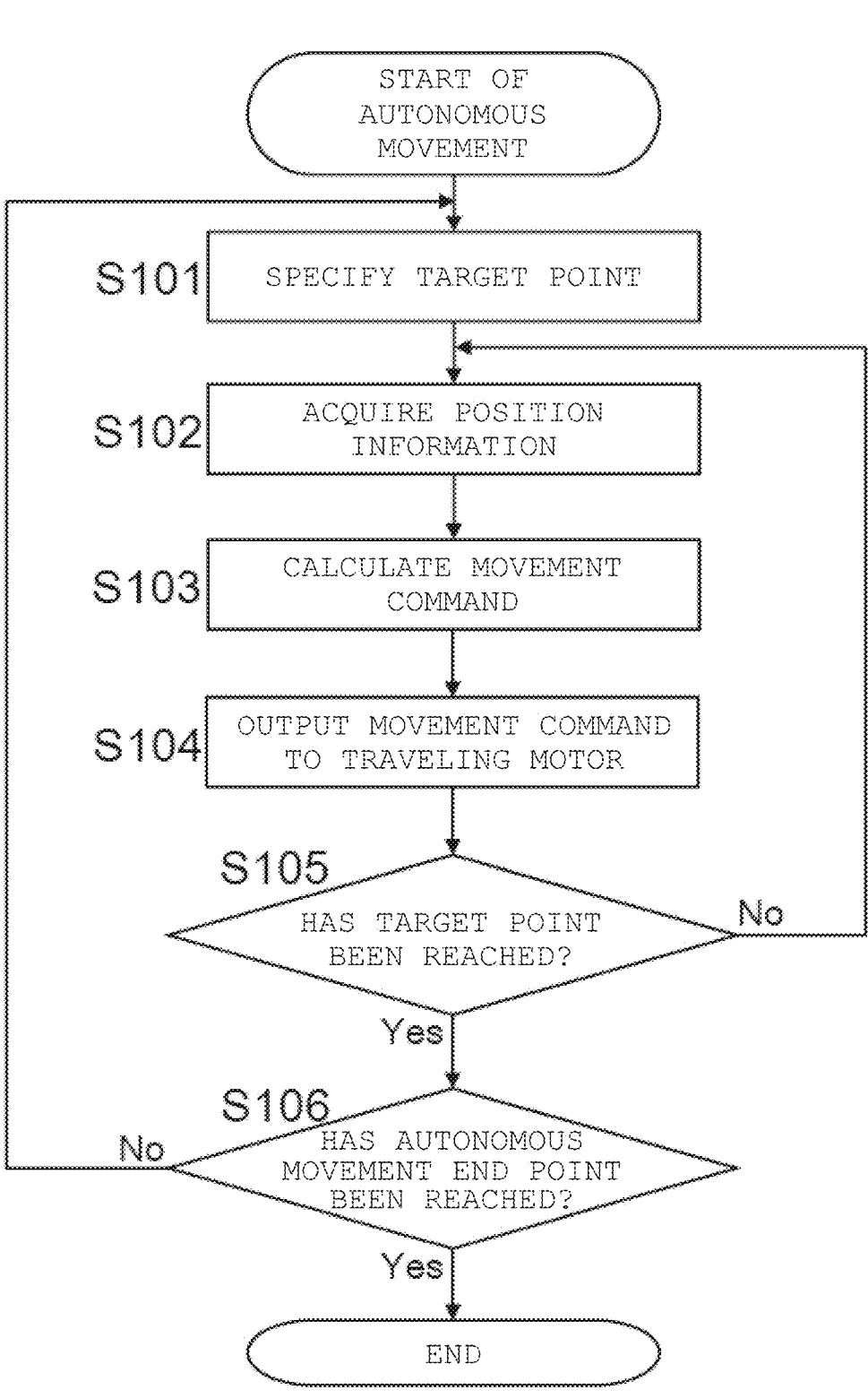
FIG. 18 is a flowchart illustrating an autonomous movement operation.

Hereinafter, the operation of the autonomous mobile body 1 at the time of autonomous movement in accordance with the traveling schedule 101 generated as described above will be described with reference to FIG. 18. FIG. 18 is a flowchart illustrating the autonomous movement operation.

In step S101, the autonomous movement commanding unit 133 specifies a point to be a target (referred to as a target point) from the point group included in the traveling schedule 101. For example, in the traveling schedule 101, when each point and the time for passing through the point are associated with each other, the point associated with the time closest to the elapsed time from the start of the autonomous movement can be specified as the target point. Further, the autonomous movement commanding unit 133 determines whether to execute ball ejecting work at the target point from the traveling schedule 101.

Next, in step S102, the autonomous movement commanding unit 133 acquires the current position information of the autonomous mobile body 1 from the position calculation unit 134.

After acquiring the position information, in step S103, the autonomous movement commanding unit 133 calculates the control amount of the traveling motor 15b as a movement command based on the target point specified in step S101 and the position information acquired in step S102. For example, the control amount of the traveling motor 15b can be calculated based on the difference between the target point and the current position information or the ratio between the target point and the current position information.

Thereafter, in step S104, the autonomous movement commanding unit 133 outputs the movement command calculated in step S103 to the traveling control unit 132. The traveling control unit 132 supplies electric power based on the received movement command to the traveling motor 15b. Thus, the autonomous mobile body 1 autonomously moves toward the target point while changing its attitude so as to face a target direction at the target point.

When the autonomous mobile body 1 has not reached the target point after a lapse of a predetermined time (e.g., a control cycle) from the start of the movement toward target point ("No" in step S105), the autonomous movement operation returns to step S102. That is, the autonomous movement commanding unit 133 executes steps S102 to S104 until the target point is reached.

On the other hand, when the autonomous mobile body 1 has reached the target point ("Yes" in step S105) but has not reached the autonomous movement end point of the traveling schedule 101 ("No" in step S106), the autonomous movement operation returns to step S101 described above. That is, the autonomous movement commanding unit 133 executes step S101 to specify the next target point and executes steps S102 to S104 to control the traveling motor 15b so as to reach the next target point.

When the autonomous mobile body 1 reaches the target point, the autonomous movement commanding unit 133 determines whether to perform the ball ejecting work at the reached target point. Specifically, when the traveling schedule 101 indicates that the ball ejecting work is to be performed at the reached target point, the autonomous movement commanding unit 133 determines that the ball ejecting work will be performed at the reached target point and outputs the ball ejection command to the ball ejection control unit 135. The ball ejection control unit 135 that has received the ball ejection command drives the ball-ejecting-part motor 25a to execute the ball ejecting work at the target point.

On the other hand, when the autonomous mobile body 1 reaches the target point ("Yes" in step S105) and the target point is the autonomous movement end point of the traveling schedule 101, that is, when the autonomous mobile body 1 reaches the autonomous movement end point ("Yes" in step S106), the autonomous movement operation ends.

2. Second Preferred Embodiment

In the first preferred embodiment described above, after the autonomous movement along the filling-in path in the specific area A (the specific areas A1, A2 in the example of FIG. 6), a point-to-point path from the end position (a position in the specific area A) of the filling-in path to the start point (the positions P5, P9 in the example of FIG. 6) (a position in the specific area A) of the path toward the ball ejection groove 7 (the movement paths TR5, TR9 in the example of FIG. 6) has been created using the path creation method using the Dubins path. This point-to-point path is created so as to be held within the specific area A. On the other hand, for example, in the autonomous mobile body 1 that is a ball collecting and ejecting machine, there is a case where the golf balls B are full at the ball collecting and ejecting part 23 during the autonomous movement along the filled path and a ball ejection command for the golf balls B is issued during the autonomous movement along the filling-in path in order to ejection the golf balls B into the ball ejection groove 7. In this case, after stopping by suspending the autonomous movement currently being executed, the autonomous mobile body 1 plans a point-to-point path from a position where the autonomous mobile body 1 stopped to the start point of the path toward the vicinity of the ball ejection groove 7.

When a command is issued to plan the point-to-point path (e.g., a ball ejection command) during the autonomous movement as described above, after the autonomous mobile body 1 stops by the command to stop the point-to-point path, the point-to-point path that connects the target position in the specific area A from the stop position and is held within the specific area A may not be planned. For example, when the command is issued to plan the point-to-point path during the movement through the position of the end of the specific area A, and as a result, the autonomous mobile body 1 further moves to the position of the end of the specific area A, the point-to-point path that is held within the specific area A cannot be planned.

Therefore, in the second preferred embodiment, when a command is issued to plan a point-to-point path with a predetermined target position in the specific area A as an end point during autonomous movement in the specific area A, at the timing of the command to plan the point-to-point path, it is determined whether it is possible to plan a point-to-point path with a position where stopping is made by suspension of the autonomous movement currently being executed as a start point and with a predetermined target position as an end point, so as to be held within the specific area A, and when it is determined that it is possible, the autonomous movement is suspended and the plan of the point-to-point path is executed.

Hereinafter, an autonomous movement operation according to the second preferred embodiment will be described. As will be described later, in the autonomous movement operation according to the second preferred embodiment, when a command is issued to plan a point-to-point path that is held within the specific area A with a predetermined target position (e.g., the start point of the path toward the ball ejection groove 7) in the specific area A as an end point during autonomous movement in the specific area A, it is determined whether the stop position of the autonomous mobile body 1 after the autonomous movement currently being executed is suspended is a position with which the point-to-point path having the stop position as the start point and the target position as the end point can be planned to be held within the specific area A. This determination is made based on whether the current position of the autonomous mobile body 1 at the timing of the command to plan the point-to-point path (during the execution of the autonomous movement) is included in a suspension possible area SA. The suspension possible area SA is an area that defines a range of a position (current position) where the point-to-point path with the position of the autonomous mobile body 1 when the autonomous mobile body 1 stops by suspending the autonomous movement at the current position as a start point and the target position as an end point can be planned to be held within the specific area A.

In the present preferred embodiment, the suspension possible area SA is set in advance and stored into the storage unit 131. This eliminates the need for the control unit 13 to calculate the suspension possible area SA during the execution of the autonomous movement, so that a load on the control unit 13 during the execution of the autonomous movement can be reduced. In another preferred embodiment, the setting of the suspension possible area SA can be executed during the autonomous movement.

Hereinafter, a method for setting the suspension possible area SA will be described. The suspension possible area SA can be set by (i) determining an area including the first turning circle C1 (referred to as a turning-circle included area CA) with the stop position of the autonomous mobile body 1 at the time of stopping by suspending the autonomous movement currently being executed as a contact point, and (ii) determining the suspension possible area SA in which the turning-circle included area CA can be held within in the specific area A.

Figure 20A:
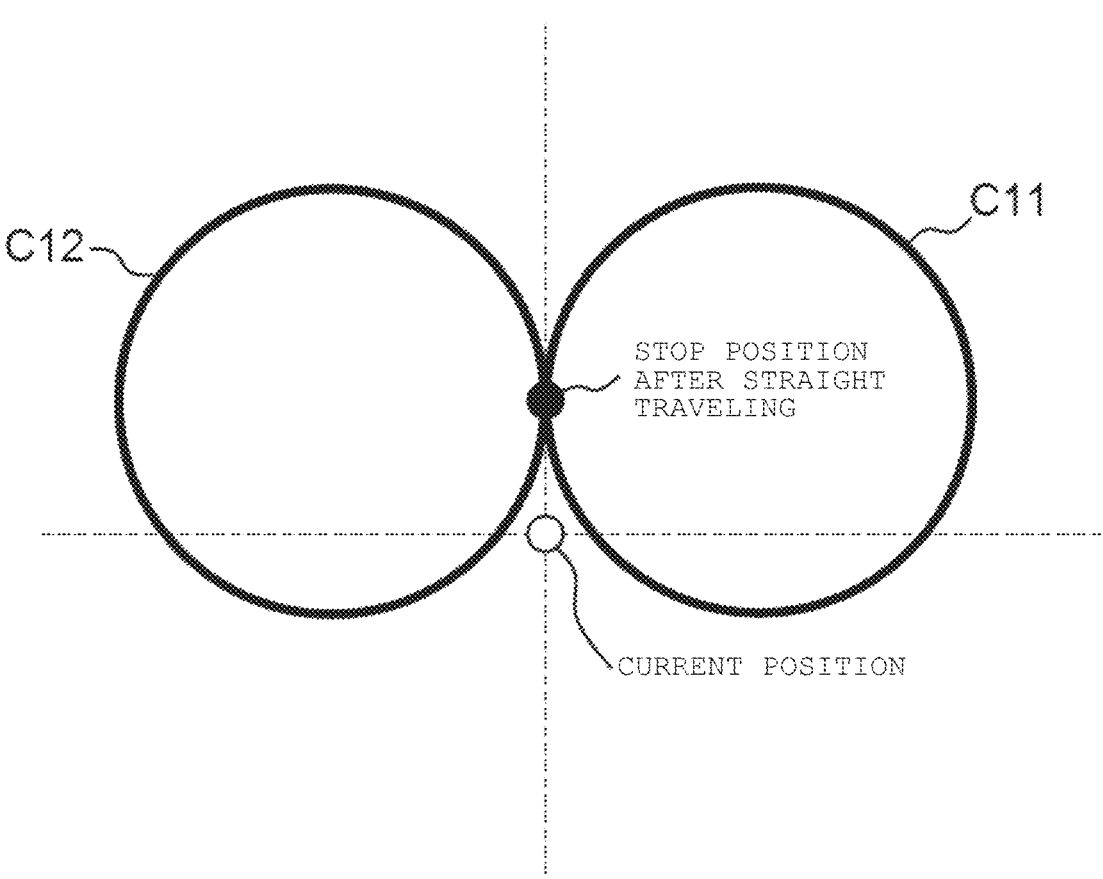
FIG. 20A is a diagram (part 1) illustrating an example of a method for determining a turning-circle included area.
Figure 20B:
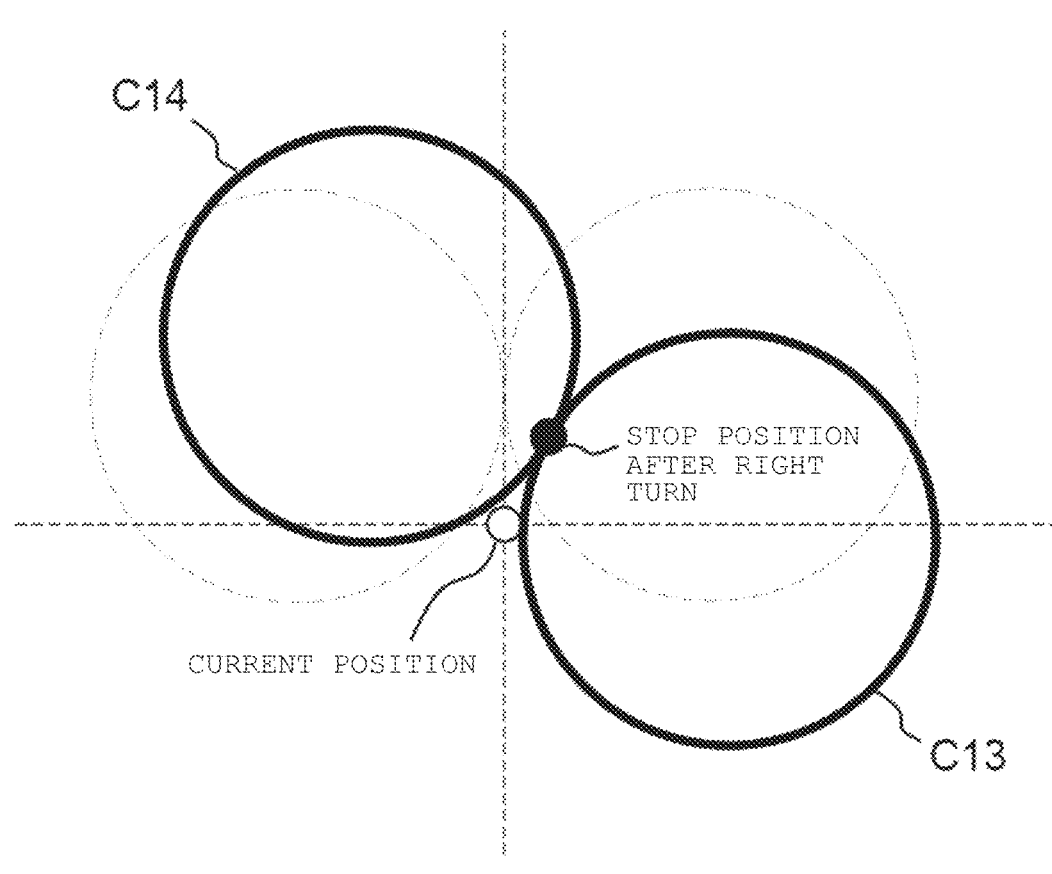
FIG. 20B is a diagram (part 2) illustrating an example of the method for determining the turning-circle included area.
Figure 20C:
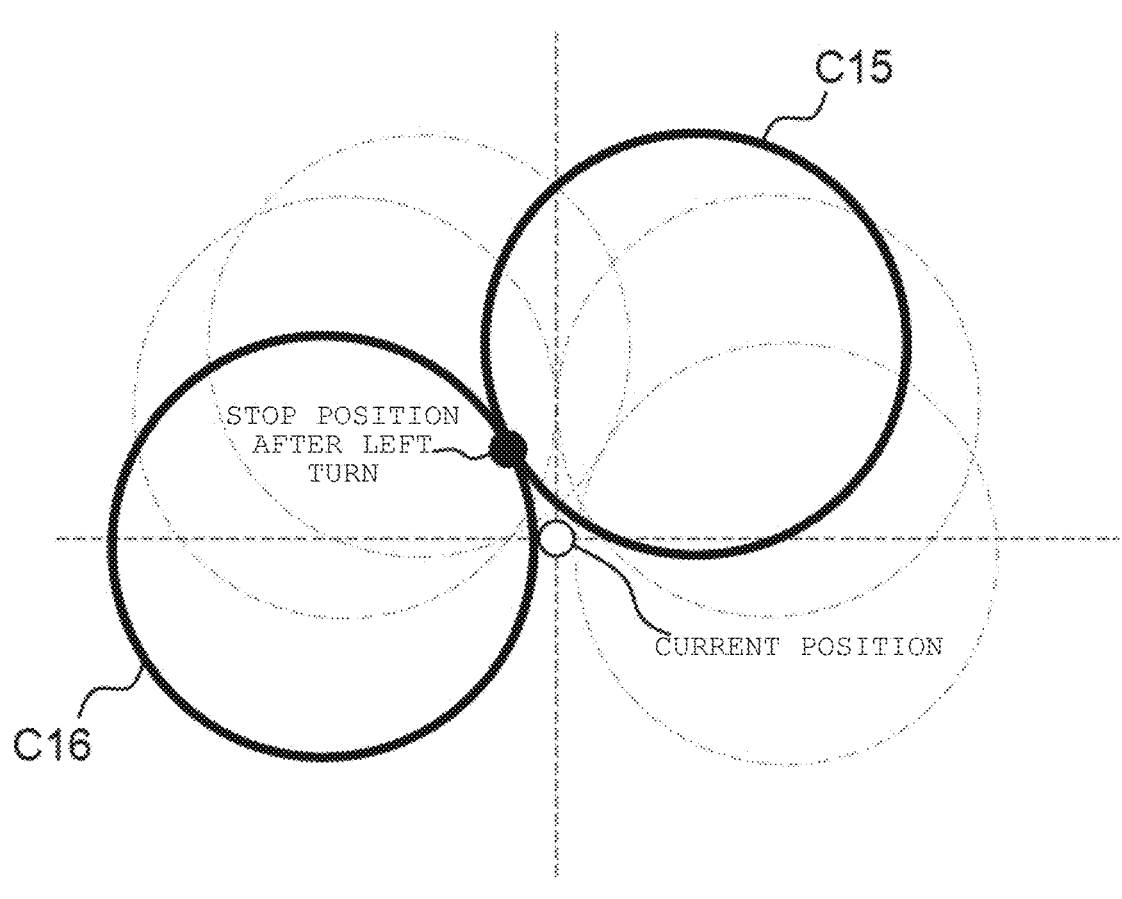
FIG. 20C is a diagram (part 3) illustrating an example of the method for determining the turning-circle included area.
Figure 20D:
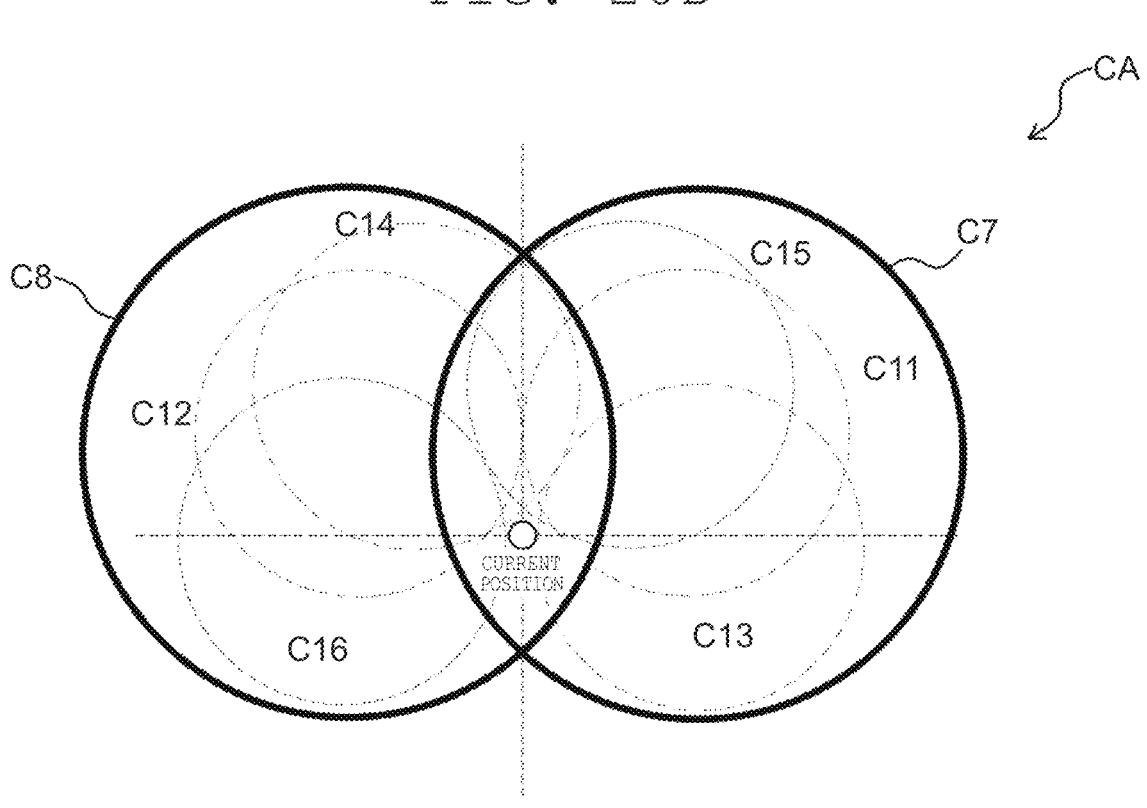
FIG. 20D is a diagram (part 4) illustrating an example of the method for determining the turning-circle included area.

First, a method for determining the turning-circle included area CA will be described. As illustrated in FIGS. 20A to 20D, the turning-circle included area CA is determined as an area including two first turning circles C11, C12 (FIG. 20A) that can be set at a position where the autonomous mobile body 1 stops by suspending the left turning while traveling straight at the maximum speed, two first turning circles C13, C14 (FIG. 20B) that can be set at a position where the autonomous mobile body 1 stops by suspending the right turning while turning right at the maximum speed, and two first turning circles C15, C16 (FIG. 20C) that can be set at a position where the autonomous mobile body 1 stops by suspending the left turning while turning left at the maximum speed. In the present preferred embodiment, as illustrated in FIG. 20D, an area inside a first circle C7 including the first turning circles C11, C13, C15 on the right side in the traveling direction of the autonomous mobile body 1 and a second circle C8 including the first turning circles C12, C14, C16 on the left side is defined as the turning-circle included area CA. Note that the position where the stopping is made by suspending the movement/turning during the movement/turning at the maximum speed can be confirmed experimentally. Also, the stop position can be calculated by theoretical calculation. FIGS. 20A to 20D are diagrams illustrating an example of a method for determining the turning-circle included area CA.

Note that the shape of the turning-circle included area CA including the six first turning circles C11 to C16 is not limited to a shape of two circles. For example, the turning-circle included area CA may be set by two or more circles and/or ellipses including the six first turning circles C11 to C16. In addition, the inside of the six first turning circles C11 to C16 may be set as the turning-circle included area CA.

Next, a method for setting the suspension possible area SA will be described. The suspension possible area SA is set as an area indicating a range of the position of the autonomous mobile body 1 in which the turning-circle included area CA can be held within the specific area A. Here, "the turning-circle included area CA is held within the specific area A" means that at least one of two circles (the first circle C7 and the second circle C8) defining the turning-circle included area CA is held within the specific area A. As thus described, by defining the suspension possible area SA as an area where the first turning circles C11 to C16 settable at the position where the stopping is made during the movement at the maximum speed can be included in the specific area A, it is possible to more accurately determine whether the current position of the autonomous mobile body 1 is a position suitable for suspending the autonomous movement and planning the point-to-point path that is held within the specific area A.

Figure 21A:
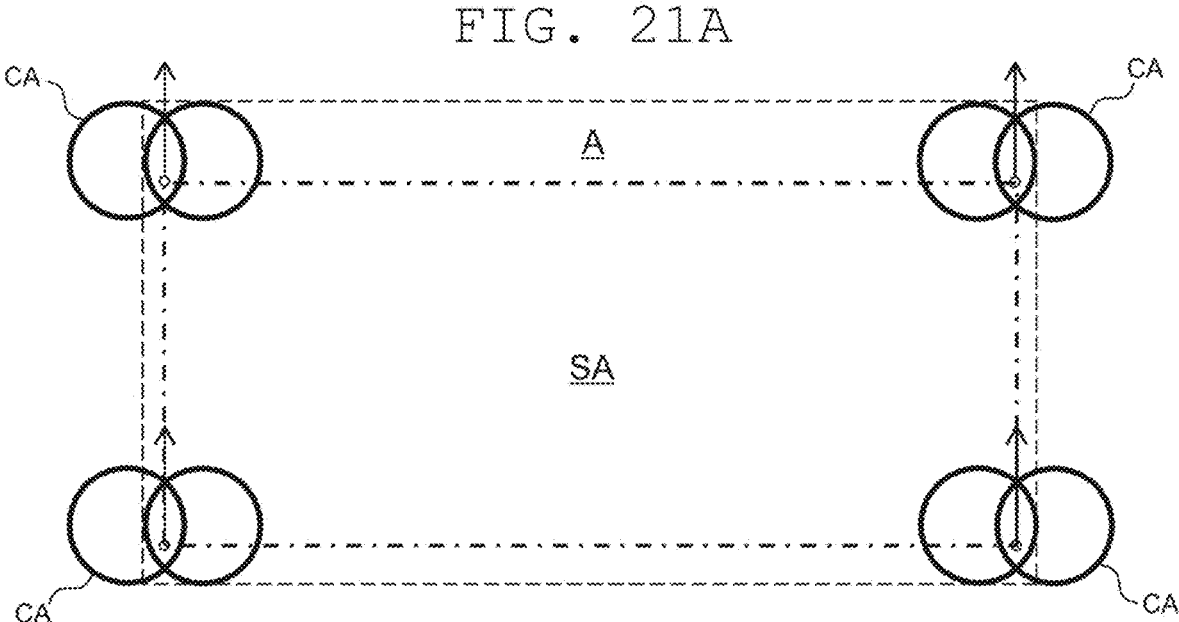
FIG. 21A is a diagram illustrating an example of a suspension possible area set when an attitude angle is 0 degrees.
Figure 21B:
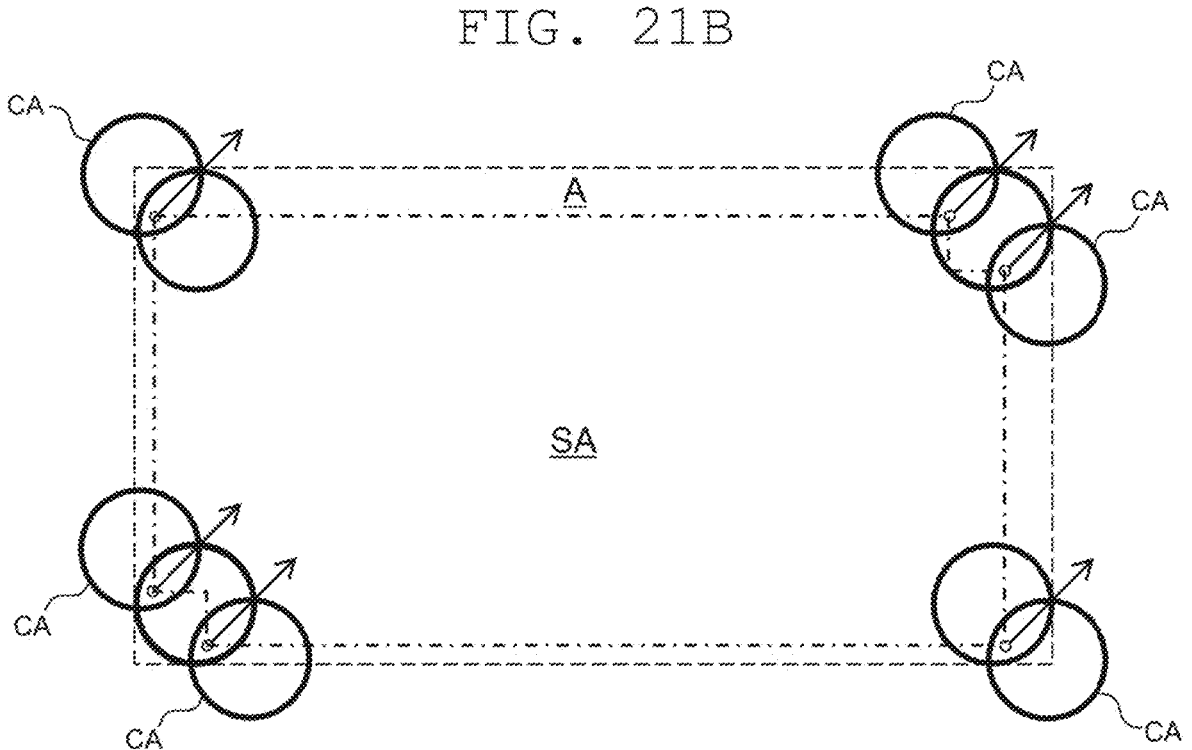
FIG. 21B is a diagram illustrating an example of a suspension possible area set when the attitude angle is 45 degrees.

When the suspension possible area SA is defined as described above, as illustrated in FIGS. 21A and 21B, the size and shape of the suspension possible area SA are different depending on a facing direction (an attitude angle) of the autonomous mobile body 1. In FIGS. 21A and 21B, the attitude angle of the autonomous mobile body 1 is indicated by an arrow. FIG. 21A is a diagram illustrating an example of the suspension possible area SA set when the attitude angle is 0 degrees. FIG. 21B is a diagram illustrating an example of the suspension possible area SA set when the attitude angle is 45 degrees.

Therefore, the suspension possible area SA is set for each predetermined angle of the attitude angle and stored into the storage unit 131. Specifically, when the predetermined angle is θ, a plurality of suspension possible areas SA are set and stored into the storage unit 131, which include a suspension possible area SA when the range of the attitude angle is 0 to θ, a suspension possible area SA when the range of the attitude angle is θ/2 to 3θ/2, a suspension possible area SA when the range of the attitude angle is θ to 2θ, suspension possible areas SA, and a suspension possible area SA when the range of the attitude angle is 3θ/2 to 5θ/2. By setting the suspension possible area SA for each predetermined angle of the attitude angle as thus described, it is possible to accurately determine whether the autonomous mobile body 1 during the autonomous movement can suspend the autonomous movement and plan the point-to-point path that is held within the specific area A at any attitude angle of the autonomous mobile body 1.

Figure 22:
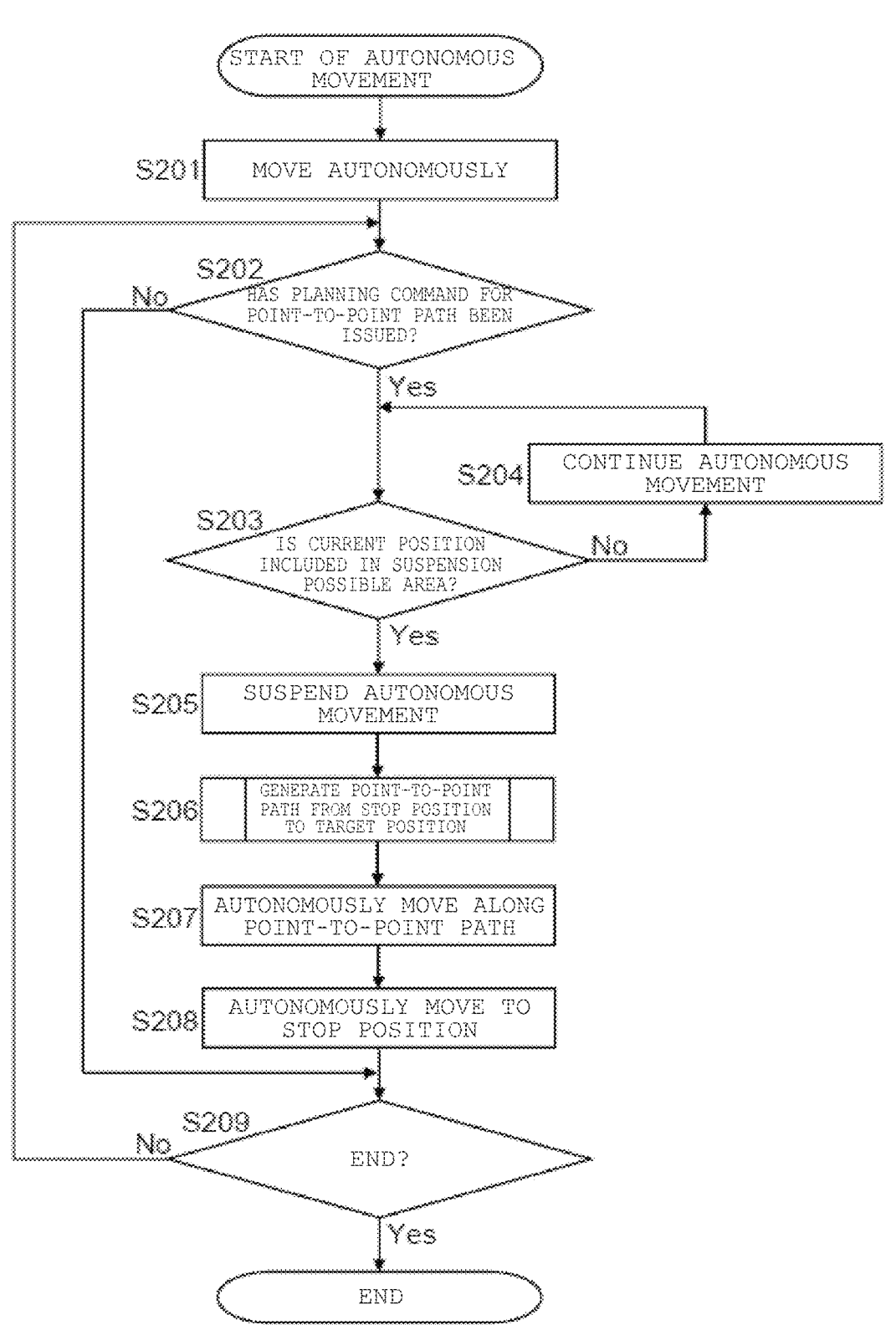
FIG. 22 is a flowchart illustrating an autonomous movement operation according to a second preferred embodiment of the present invention.

Hereinafter, the autonomous movement operation in the second preferred embodiment will be described with reference to FIG. 22. FIG. 22 is a flowchart illustrating the autonomous movement operation according to the second preferred embodiment. First, in step S201, the autonomous mobile body 1 starts the autonomous movement. For example, the autonomous mobile body 1 starts the autonomous movement along the filling-in paths in the specific areas A1, A2. The autonomous movement operation is executed in accordance with steps S101 to S106 described in the first preferred embodiment.

During the autonomous movement, in step S202, the control unit 13 determines whether a planning command for a point-to-point path that is held within the specific area A with a predetermined target position as an end point has been issued to the autonomous mobile body 1. For example, when a ball ejection command for the golf balls B is issued during the autonomous movement, it is determined that a planning command for a point-to-point path with a start point (e.g., the positions P5, P9 which are the start points of the movement paths TR5, TR9, respectively) of a path toward the vicinity of the ball ejection groove 7 as an end point has been issued. The planning command for the point-to-point path (the ball ejection command) is output, for example, when it is detected by a storage amount detector provided in the ball collecting and ejecting part 23 that the storage amount of the golf balls B has exceeded a predetermined threshold. In addition, for example, a remote-control operation panel may output the planning command for the point-to-point path (the ball ejection command) to the autonomous mobile body 1 by a user's operation.

When the planning command for the point-to-point path has been issued ("Yes" in step S202), the control unit 13 determines whether the current position (the estimated self-position) of the autonomous mobile body 1 is included in the suspension possible area SA in step S203. As described above, the size and the shape of the suspension possible area SA are different depending on the attitude angle of the autonomous mobile body 1. Therefore, the control unit 13 selects the suspension possible area SA corresponding to the current attitude angle of the autonomous mobile body 1 (i.e., the attitude angle of the autonomous mobile body 1 at the current position) from the storage unit 131 and determines whether the current position of the autonomous mobile body 1 is included in the selected suspension possible area SA.

Note that there may be two suspension possible areas SA generated by the above setting method depending on the attitude angle. For example, in the range of the attitude angle of θ/2 to θ, there are a suspension possible area SA when the range of the attitude angle is 0 to θ and a suspension possible area SA when the range of the attitude angle is θ/2 to 3θ/2. In this case, the control unit 13 selects the suspension possible area SA depending on which angle range of the suspension possible area SA the current attitude angle is close to. For example, when the current attitude angle is equal to or larger than θ/2 and equal to or smaller than 3θ/4, the suspension possible area SA when the range of the attitude angle is 0 to θ can be selected, and when the range of the attitude angle is larger than 3θ/4 and equal to or smaller than θ, the suspension possible area SA when the range of the attitude angle is θ/2 to 3θ/2 can be selected.

When the current position of the autonomous mobile body 1 is not included in the suspension possible area SA ("No" in step S203), it is determined that even when the autonomous movement is suspended at the current position, the point-to-point path that is held within the specific area A with the target position as the end point cannot be planned. In this case, the control unit 13 continues the autonomous movement currently being executed until the autonomous mobile body 1 reaches the position included in the suspension possible area SA (step S204).

On the other hand, when the current position is included in the suspension possible area SA ("Yes" in step S203), it is determined that suspending the autonomous movement at the current position makes it possible to plan the point-to-point path that is held within the specific area A with the target position as the end point. In this case, the control unit 13 suspends the autonomous movement currently being executed to stop the autonomous mobile body 1 (step S205). Thereafter, by using a Dubins path, the control unit 13 plans a point-to-point path with the position where the stopping has been made by the suspension of the autonomous movement as a start point and the target position as an end point (step S206). The point-to-point path from the stop position to the predetermined target position is planned by executing steps S31 to S42 described in the first preferred embodiment.

After planning the point-to-point path, the control unit 13 autonomously moves the autonomous mobile body 1 from the stop position to the predetermined target position (step S207). After ending the autonomous movement, the control unit 13 autonomously moves the autonomous mobile body 1 to return to the stop position of the autonomous mobile body 1 in step S205 (step S208). For example, the control unit 13 autonomously moves the autonomous mobile body 1 from the stop positions to the positions P5, P9, which are the start points of the movement paths TR5, TR9, and then autonomously moves the autonomous mobile body 1 to the positions P6, P10 which are the end points, along the movement paths TR5, TR9. Thereafter, the control unit 13 can return the autonomous mobile body 1 to the stop positions where the autonomous mobile body 1 stopped in step S205 by planning paths from the positions P6, P10 to the stop positions and autonomously moving the autonomous mobile body 1 along the paths.

Note that the paths from the positions P6, P10 to the stop positions in step S205 can be planned using an arbitrary path planning method.

When the autonomous movement suspended in step S205 is to be continued after the autonomous mobile body 1 returns to the stop position ("No" in step S209), the control unit 13 resumes the autonomous movement suspended in step S205 from the stop position. On the other hand, when the autonomous movement is to be ended ("Yes" in step S209), the control unit 13 ends the autonomous movement.

As described above, when a command is issued to plan the point-to-point path while the autonomous movement in the specific area is being executed, and when the current position of the autonomous mobile body 1 (the position of the autonomous mobile body 1 at the timing of the command) is included in the suspension possible area SA, the autonomous movement currently being executed is suspended and the point-to-point path is planned, so that it is possible to prevent the planned point-to-point path from going out of the specific area as a result of planning the point-to-point path from the position where the stopping is made by suspending the autonomous movement.

The above preferred embodiment can also be described as follows.

(1) The path generating method is a method for generating a movement path (e.g., the movement paths TR4, TR8) of an autonomous mobile body that moves from a start point (e.g., the positions P4, P8) existing in a specific area (e.g., the specific areas A, A1, A2) to an end point (e.g., the positions P5, P9) existing in the specific area. The path generating method includes the following steps.

A step of setting a moving direction (e.g., the moving directions DI1, DI2) at each of the start point and the end point (e.g., step S33).

A step (e.g., steps S34, S38) of setting a first turning circle (e.g., the first turning circles C1, C4) having a contact point at the start point or the end point and having a turning direction in the moving direction.

A step (e.g., steps S35, S39) of setting a second turning circle (e.g., second turning circles C2, C5) that is held within the specific area.

A step of setting a Dubins path that starts from a predetermined point of the second turning circle or ends at the predetermined point (e.g., steps S36, S40).

A step of selecting, as the movement path, a path that is held within a specific area within the specific area among paths each including the first turning circle and the Dubins path (e.g., steps S37, S41, S42).

In the above path generating method, before the generation of the Dubins path, a first turning circle having a contact point at the start point or the end point and having a turning direction in a moving direction at the start point or the end point is set, and then a second turning circle to be a part of the Dubins path is set. By setting the first turning circle before the generation of the Dubins path and then setting the second turning circle, it is possible to ensure an area necessary for generating the Dubins path in the specific area. As a result, a point-to-point path that is held within the specific area can be generated for more combinations of start points and end points in a small specific area.

(2) In the path generating method of (1) above, the first turning circle and the second turning circle may be tangent to each other with the predetermined point as a contact point. This eliminates the need for a path connecting the first turning circle and the second turning circle, so that a shorter point-to-point path can be generated.

(3) In the path generating method of (2) above, when the start point of the movement path is a point on the circumference of the first turning circle, the step of setting the Dubins path may include a step of setting Dubins path from the contact point between the first turning circle and the second turning circle to the end point. As a result, when the first turning circle is set with reference to the start point of the movement path, it is possible to generate a point-to-point path including a path from the start point of the movement path to the contact point between the first turning circle and the second turning circle and a Dubins path from the contact point to the end point of the movement path.

(4) In the path generating method of (2) above, when the end point of the movement path is a point on the circumference of the first turning circle, the step of setting the Dubins path may include a step of setting the contact point between the first turning circle and the second turning circle as a temporary end point and setting a Dubins path from the start point to the temporary end point. As a result, when the first turning circle is set with reference to the end point of the movement path, it is possible to generate a point-to-point path including a Dubins path from the start point of the movement path to the temporary end point of the second turning circle and a path for moving along the first turning circle from the temporary end point to the end point of the movement path.

(5) In the path generating method of (2) above, when the end point is a point on the circumference of the first turning circle, the step of setting the Dubins path may include the following steps.

A step of setting a Dubins path from the contact point between the first turning circle and the second turning circle to the start point.

A step of reversing the Dubins path to form a path from the start point toward the contact point.

As a result, when the first turning circle is set with reference to the end point of the movement path, it is possible to generate a point-to-point path including a Dubins path from the start point of the movement path to the contact point between the first turning circle and the second turning circle and a path for moving along the first turning circle from the contact point to the end point of the movement path.

(6) In the path generating method of (1) above, the first turning circle and the second turning circle may not be in contact with each other. This makes the second turning circle flexibly settable.

(7) In the path generating methods of (1) to (6) above, each of the first turning circle and the second turning circle may be a circle formed with the minimum turning radius of the autonomous mobile body. Thus, the shortest point-to-point path can be generated in consideration of the traveling performance of the autonomous mobile body.

(8) In the path generating methods of (1) to (6) above, the autonomous mobile body may tow the cart. In this case, each of the first turning circle and the second turning circle may be a circle formed with the minimum turning radius of the autonomous mobile body including the cart towed by the autonomous mobile body. Thus, the shortest point-to-point path can be generated in consideration of the traveling performance of the autonomous mobile body that tows the cart.

(9) The path generating methods of (1) to (8) above may further include the following steps.

A step of determining whether a current position of the autonomous mobile body is included in a suspension possible area that defines a position range, in which it is possible to plan that the movement path having the start point at a position at a time of stopping of the autonomous movable body by suspension of autonomous movement currently being executed at the current position and having the end point at the target position is held within the specific area, when a command is issued to generate the movement path with a predetermined target position in the specific area as the end point during the autonomous movement in the specific area.

A step of suspending the autonomous movement currently being executed when the current position of the autonomous mobile body is included in the suspension possible area.

A step of generating the movement path with a position where the stopping is made after the suspension of the autonomous movement currently being executed as the start point and the target position as the end point.

Thus, even when a command is issued to plan the movement path during the execution of the autonomous movement, it is possible to prevent the planned movement path from going out of the specific area as a result of planning the movement path from the position where the stopping is made by the suspension of the autonomous movement.

(10) In the path generating method of (9) above, the suspension possible area may be set as an area indicating a range of a position where the turning-circle included area can be held within the specific area. The turning-circle included area includes the first turning circle settable at a position where the autonomous mobile body stops by suspending its movement while traveling straight at a maximum speed, the first turning circle settable at a position where the autonomous mobile body stops by suspending its movement while turning right at a maximum speed, and the first turning circle settable at a position where the autonomous mobile body stops by suspending its movement while turning left at a maximum speed. Thus, it is possible to more accurately determine whether the current position of the autonomous mobile body is a position suitable for suspending the autonomous movement and generating the movement path.

(11) In the path generating methods of (9) to (10) above, the suspension possible area may be set for each attitude angle of the autonomous mobile body. In this case, the step of determining whether the current position of the autonomous mobile body is included in the suspension possible area may include the following steps.

A step of selecting a suspension possible area corresponding to an attitude angle of the autonomous mobile body at the current position.

A step of determining whether a current position of the autonomous mobile body is included in the suspension possible area selected.

Thus, it is possible to accurately determine whether the autonomous movement of the autonomous mobile body during the autonomous movement can be suspended and the point-to-point path that is held within the specific area can be planned at an arbitrary attitude angle of the autonomous mobile body.

(12) The path generating method of (9) to (11) above may further include a step of continuing the autonomous movement currently being executed when the current position of the autonomous mobile body is not included in the suspension possible area. Thus, the autonomous mobile body can be moved to another position by autonomous movement and the autonomous movement can be suspended to attempt to generate a movement path from another position.

(13) A non-transitory computer-readable medium according to another aspect of a preferred embodiment of the present invention includes a program for causing a computer to execute the path generating methods of (1) to (12) above.

(14) A path generating device (e.g., the control unit 13) generates a movement path of an autonomous mobile body that moves from a start point existing in a specific area to an end point existing in the specific area. The path generating device sets a moving direction at the start point and the end point, sets a first turning circle having a contact point at the start point or the end point and having a turning direction in the moving direction, sets a second turning circle that is held within the specific area, sets a Dubins path that starts from a predetermined point of the second turning circle or ends at the predetermined point, and selects, as the movement path, a path that is held within the specific area among paths each including the first turning circle and the Dubins path.

Before generating the Dubins path, the path generating device sets a first turning circle having a contact point at the start point or the end point and a moving direction at the start point or the end point as a turning direction, and then sets a second turning circle to be a part of the Dubins path. By setting the first turning circle before the generation of the Dubins path and then setting the second turning circle, it is possible to ensure an area necessary for generating the Dubins path in the specific area. As a result, a point-to-point path that is held within the specific area can be generated using the Dubins path for more combinations of start points and end points in a small specific area.

(15) In the path generating device of (14) above, the first turning circle and the second turning circle may be tangent to each other with the predetermined point as a contact point. This eliminates the need for generating a path connecting the first turning circle and the second turning circle, so that a shorter point-to-point path can be generated.

(16) In the path generating device of (15) above, when the start point of the movement path is a point on the circumference of the first turning circle, a Dubins path from the contact point between the first turning circle and the second turning circle to the end point may be set. As a result, when the first turning circle is set with reference to the start point of the movement path, it is possible to generate a point-to-point path including a path from the start point of the movement path to the contact point between the first turning circle and the second turning circle and a Dubins path from the contact point to the end point of the movement path.

(17) In the path generating device of (15) above, when the end point of the movement path is a point on the circumference of the first turning circle, the contact point between the first turning circle and the second turning circle may be set as a temporary end point, and a Dubins path from the start point of the movement path to the temporary end point may be set. As a result, when the first turning circle is set with reference to the end point of the movement path, it is possible to generate a point-to-point path including a Dubins path from the start point of the movement path to the temporary end point of the second turning circle and a path for moving along the first turning circle from the temporary end point to the end point of the movement path.

(18) In the path generating device of (15) above, when the end point of the movement path is a point on the circumference of the first turning circle, a Dubins path from the contact point of the first turning circle and the second turning circle to the start point may be set, and the path from the start point toward the contact point may be generated by reversing the Dubins path. As a result, when the first turning circle is set with reference to the end point of the movement path, it is possible to generate a point-to-point path including a Dubins path from the start point of the movement path to the contact point between the first turning circle and the second turning circle and a path for moving along the first turning circle from the contact point to the end point of the movement path.

(19) In the path generating device of (14) above, the first turning circle and the second turning circle may not be in contact with each other. This makes the second turning circle flexibly settable.

(20) In the path generating device of (14) to (19) above, each of the first turning circle and the second turning circle is a circle formed with the minimum turning radius of the autonomous mobile body. Thus, the shortest point-to-point path can be generated in consideration of the traveling performance of the autonomous mobile body.

(21) In the path generating devices of (14) to (19) above, the autonomous mobile body may tow the cart. In this case, each of the first turning circle and the second turning circle is a circle formed with the minimum turning radius of the autonomous mobile body including the cart towed by the autonomous mobile body. Thus, the shortest point-to-point path can be generated in consideration of the traveling performance of the autonomous mobile body that tows the cart.

(22) The path generating devices of (14) to (21) above may determine whether a current position of the autonomous mobile body is included in a suspension possible area that defines a position range, in which the target position having the start point at a position at a time of stopping of the autonomous movable body by suspension of autonomous movement currently being executed at the current position and having the end point at the movement path is held within the specific area, when a command is issued to generate the movement path with a predetermined target position in the specific area as the end point during the autonomous movement in the specific area, may suspend the autonomous movement currently being executed when the current position of the autonomous mobile body is included in the suspension possible area, and may generate the movement path with a position where the stopping is made after the suspension of the autonomous movement currently being executed as the start point and the target position as the end point.

Thus, even when a command is issued to plan the movement path during the execution of the autonomous movement, it is possible to prevent the planned movement path from going out of the specific area as a result of planning the movement path from the position where the stopping is made by the suspension of the autonomous movement.

(23) In the path generating devices of (22) above, the suspension possible area may be set as an area indicating a range of a position where the turning-circle included area can be held within the specific area. The turning-circle included area includes the first turning circle settable at a position where the autonomous mobile body stops by suspending its movement while traveling straight at a maximum speed, the first turning circle settable at a position where the autonomous mobile body stops by suspending its movement while turning right at a maximum speed, and the first turning circle settable at a position where the autonomous mobile body stops by suspending its movement while turning left at a maximum speed. Thus, it is possible to more accurately determine whether the current position of the autonomous mobile body is a position suitable for suspending the autonomous movement and generating the movement path.

(24) In the path generating devices of (22) to (23) above, the suspension possible area may be set for each attitude angle of the autonomous mobile body. In this case, the path generating device may select a suspension possible area corresponding to an attitude angle of the autonomous mobile body at the current position, and may determine whether a current position of the autonomous mobile body is included in the suspension possible area selected. Thus, it is possible to accurately determine whether the autonomous movement of the autonomous mobile body during the autonomous movement can be suspended and the point-to-point path that is held within the specific area can be planned at an arbitrary attitude angle of the autonomous mobile body.

(25) The path generating devices of (22) to (24) above may continue the autonomous movement currently being executed when the current position of the autonomous mobile body is not included in the suspension possible area. Thus, the autonomous mobile body can be moved to another position by autonomous movement and the autonomous movement can be suspended to attempt to generate a movement path from another position.

(26) An autonomous mobile object (e.g., the autonomous mobile body 1) includes a main body (e.g., the main body 11), the path generating device of one of (14) to (25) above, and a mover (e.g., the moving part 15) to move the main body along the movement path generated by the path generating device.

4. Other Preferred Embodiments

Although the preferred embodiments of the present invention have been described above, the present invention is not limited to the above preferred embodiment, and various changes can be made in a range not deviating from the gist of the invention. In particular, a plurality of preferred embodiments and alternative preferred embodiments described in the present specification can be combined in a freely selected manner as required.

(A) The processing order of each step and/or the processing content of each step in the flowcharts illustrated in FIGS. 7, 8, and 18 can be appropriately changed without departing from the gist of a preferred embodiment of the present invention.

(B) When the first turning circle C4 is set with reference to the end point (e.g., the position P9) of the point-to-point path, the Dubins path may be generated in the opposite direction to that in the first preferred embodiment, and the generated Dubins path may then be reversed.

Specifically, at the time of setting the second turning circle C5 in step S39, the rotation direction of the second turning circle C5 is set to be the opposite direction (clockwise) to the rotation direction (counterclockwise) in the first preferred embodiment. Thereafter, in step S40, a Dubins path from the contact point P4' between the first turning circle C4 and the second turning circle C5 to the start point (the position P8) is generated. Thus, an RSR path from the contact point P4' to the position P8 is generated.

Thereafter, the RSR path from the contact point P4' to the position P8 is converted into an LSL path from the position P8 to the contact point P4'. By such a method as well, the movement path TR8 similar to that described in the first preferred embodiment can be generated.

(C) The second turning circles C2, C5 may not be tangent to the first turning circles C1, C4 so long as the second turning circles C2, C5 are held within the specific areas A1, A2. Thus, each of the second turning circles C2, C5 can be flexibly set, so that the point-to-point path that is held within the specific areas A1, A2 can be more reliably generated using the Dubins path.

Figure 19:
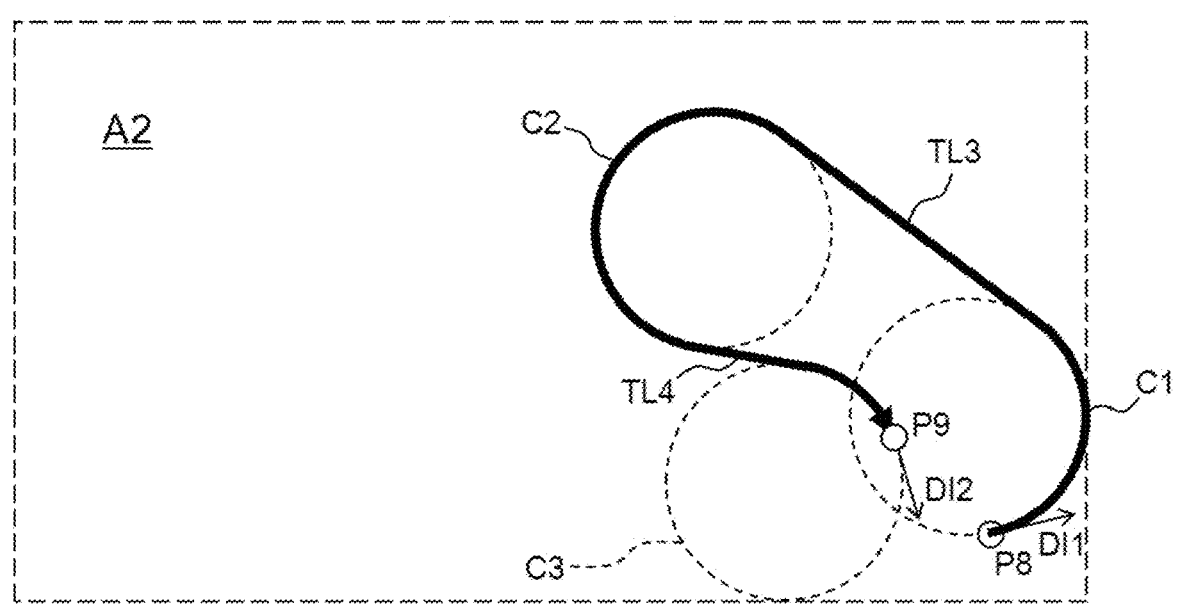
FIG. 19 is a diagram illustrating another example of the point-to-point path.

For example, as illustrated in FIG. 19, it is possible to generate a path for moving from the position P8 along the first turning circle C1, moving along a tangent line TL3 that connects the first turning circle C1 and the second turning circle C2, moving from the tangent line TL3 to the second turning circle C2, moving along the second turning circle C2, moving from the second turning circle C2 to the tangent line TL4, moving from the tangent line TL4 to the third turning circle C3, and moving along the third turning circle C3 to reach the position P9. Note that the path including the first turning circle C1, the second turning circle C2, and the tangent line TL3 can be generated using the Dubins path. FIG. 19 is a diagram illustrating another example of the point-to-point path.

(D) For example, when the autonomous mobile body 1 is not towing the ball collecting and ejecting part 23, the first turning circles C1, C4, the second turning circles C2, C5, and the third turning circles C3, C6 may each have the minimum turning radius with which the autonomous mobile body 1 can turn. This makes it possible to generate a movement path considering only the traveling performance of the autonomous mobile body 1. Note that the minimum turning radius of only the autonomous mobile body 1 is generally smaller than the minimum turning radius when the autonomous mobile body 1 tows the ball collecting and ejecting part 23.

(E) It is possible that just one of the generation of the movement based on the first turning circle C1 with reference to the start point and the generation of the movement path based on the first turning circle C4 with reference to the end point may be executed. For example, when the movement path can be generated based on the first turning circle C1 with reference to the start point, the generation of the movement path based on the first turning circle C4 with reference to the end point may not be executed.

(F) For example, when the start point and/or the end point (e.g., the positions P8, P9) of the point-to-point path is extremely close to the outer periphery of the specific area, and even the combination of the first turning circles C1, C4 and the Dubins path does not lead to the generation of the point-to-point path that is held within the specific area with respect to the start point and the end point, the start point and/or the end point may be moved to an appropriate position, and then steps S31 to S42 described above may be executed to generate the point-to-point path.

For example, the start point and/or the end point may be moved to a predetermined position in a specific area on a straight line extending in the moving direction of the autonomous mobile body 1 set for each point. Thus, the first turning circle can be flexibly set, and hence the point-to-point path that is held within the specific area can be more reliably generated using the Dubins path.

(G) The movement path generating method described above is not limited to the autonomous mobile body 1 as the ball collecting and ejecting machine but can be applied to other autonomous mobile bodies 1 such as an autonomous traveling robot.

Preferred embodiments of the present invention can be widely applied to generation of a path along which an autonomous mobile body is desired to move autonomously.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A path generating method for generating a movement path of an autonomous mobile body that moves from a start point in a specific area to an end point in the specific area, the path generating method comprising:

setting a moving direction at each of the start point and the end point;

setting a first turning circle including a contact point at the start point or the end point and including a turning direction in the moving direction;

setting a second turning circle within the specific area;

setting a Dubins path that starts from a predetermined point of the second turning circle or ends at the predetermined point;

selecting, as the movement path, a path that is within the specific area among paths each including the first turning circle in addition to the Dubins path; and autonomously moving the autonomous mobile body based on the movement path; wherein the specific area is a predetermined area within which the autonomous mobile body is intended to move, that is set in advance of the selection of the movement path, and within which the movement path must be held;

the second turning circle is tangent to the first turning circle; and an initial tangent or a terminal tangent that forms the Dubins path is in reverse of the turning direction of the first turning circle.

2. The path generating method according to claim 1, wherein the first turning circle and the second turning circle are tangent to each other with the predetermined point defining a contact point.

3. The path generating method according to claim 2, wherein, when the start point is a point on a circumference of the first turning circle, the setting the Dubins path includes setting a Dubins path from a contact point between the first turning circle and the second turning circle to the end point.

4. The path generating method according to claim 2, wherein, when the end point is a point on a circumference of the first turning circle, the setting the Dubins path includes setting a contact point between the first turning circle and the second turning circle as a temporary end point and setting a Dubins path from the start point to the temporary end point.

5. The path generating method according to claim 2, wherein, when the end point is a point on a circumference of the first turning circle, the setting the Dubins path includes:

setting a Dubins path from the contact point between the first turning circle and the second turning circle to the start point; and reversing the Dubins path to form a path from the start point toward the contact point.

6. The path generating method according to claim 1, wherein each of the first turning circle and the second turning circle is a circle with a minimum turning radius of the autonomous mobile body.

7. The path generating method according to claim 1, wherein the autonomous mobile body tows a cart; and each of the first turning circle and the second turning circle is a circle with a minimum turning radius of the autonomous mobile body including the cart towed by the autonomous mobile body.

8. The path generating method according to claim 1, further comprising:

determining whether a current position of the autonomous mobile body is included in a suspension possible area that defines a position range in which it is possible to plan that the movement path including the start point at a position at a time of stopping of the autonomous movable body by suspension of autonomous movement currently being executed at the current position and including the end point at the target position is within the specific area when a command is issued to generate the movement path with a predetermined target position in the specific area as the end point during the autonomous movement in the specific area;

suspending the autonomous movement currently being executed when the current position of the autonomous mobile body is included in the suspension possible area; and generating the movement path with a position where the stopping is made after the suspension of the autonomous movement currently being executed as the start point and the target position as the end point.

9. The path generating method according to claim 8, wherein the suspension possible area is set as an area indicating a range of a position where it is possible that a turning-circle included area is within the specific area, the turning-circle included area including the first turning circle settable at a position where the autonomous mobile body stops by suspending its movement while traveling straight at a maximum speed, the first turning circle settable at a position where the autonomous mobile body stops by suspending its movement while turning right at a maximum speed, and the first turning circle settable at a position where the autonomous mobile body stops by suspending its movement while turning left at a maximum speed.

10. The path generating method according to claim 8, wherein the suspension possible area is set for each attitude angle of the autonomous mobile body; and the determining whether the current position of the autonomous mobile body is included in the suspension possible area includes:

selecting a suspension possible area corresponding to an attitude angle of the autonomous mobile body at the current position; and determining whether a current position of the autonomous mobile body is included in the suspension possible area selected.

11. The path generating method according to claim 8, further comprising continuing the autonomous movement currently being executed when the current position of the autonomous mobile body is not included in the suspension possible area.

12. A non-transitory computer-readable medium including a program to cause a computer to execute the path generating method according to claim 1.

13. A path generating device to generate a movement path of an autonomous mobile body that moves from a start point in a specific area to an end point in the specific area, the path generating device comprising:

a processor configured or programmed to:

set a moving direction at each of the start point and the end point;

set a first turning circle including a contact point at the start point or the end point and including a turning direction in the moving direction;

set a second turning circle within the specific area;

set a Dubins path that starts from a predetermined point of the second turning circle or ends at the predetermined point;

select, as the movement path, a path that is within the specific area among paths each including the first turning circle in addition to the Dubins path; and control the autonomous mobile body to autonomously move based on the movement path; wherein the specific area is a predetermined area within which the autonomous mobile body is intended to move, that is set in advance of the selection of the movement path, and within which the movement path must be held;

the second turning circle is tangent to the first turning circle; and an initial tangent or a terminal tangent that forms the Dubins path is in reverse of the turning direction of the first turning circle.

14. The path generating device according to claim 13, wherein the first turning circle and the second turning circle are tangent to each other with the predetermined point as a contact point.

15. The path generating device according to claim 14, wherein, when the start point is a point on a circumference of the first turning circle, a Dubins path from a contact point between the first turning circle and the second turning circle to the end point is set.

16. The path generating device according to claim 14, wherein, when the end point is a point on a circumference of the first turning circle, the contact point between the first turning circle and the second turning circle is set as a temporary end point, and a Dubins path from the start point to the temporary end point is set.

17. The path generating device according to claim 14, wherein, when the end point is a point on a circumference of the first turning circle, a Dubins path from the contact point between the first turning circle and the second turning circle to the start point is set, and the Dubins path is reversed to generate a path from the start point toward the contact point.

18. The path generating device according to claim 13, wherein each of the first turning circle and the second turning circle is a circle with a minimum turning radius of the autonomous mobile body.

19. The path generating device according to claim 13, wherein the autonomous mobile body tows a cart; and each of the first turning circle and the second turning circle is a circle with a minimum turning radius of the autonomous mobile body including the cart towed by the autonomous mobile body.

20. The path generating device according to claim 13, wherein the processor is configured or programmed to:

determine whether a current position of the autonomous mobile body is included in a suspension possible area that defines a position range, in which it is possible to plan that the movement path including the start point at a position at a time of stopping of the autonomous movable body by suspension of autonomous movement currently being executed at the current position and including the end point at the target position is within the specific area when a command is issued to generate the movement path with a predetermined target position in the specific area as the end point during the autonomous movement in the specific area;

suspend the autonomous movement currently being executed when the current position of the autonomous mobile body is included in the suspension possible area; and generate the movement path with a position where the stopping is made after the suspension of the autonomous movement currently being executed as the start point and the target position as the end point.

21. The path generating device according to claim 20, wherein the suspension possible area is set as an area indicating a range of a position where it is possible that a turning-circle included area is within the specific area, the turning-circle included area including the first turning circle settable at a position where the autonomous mobile body stops by suspending its movement while traveling straight at a maximum speed, the first turning circle settable at a position where the autonomous mobile body stops by suspending its movement while turning right at a maximum speed, and the first turning circle settable at a position where the autonomous mobile body stops by suspending its movement while turning left at a maximum speed.

22. The path generating device according to claim 20, wherein the suspension possible area is set for each attitude angle of the autonomous mobile body; and the processor is configured or programmed to select a suspension possible area corresponding to an attitude angle of the autonomous mobile body at the current position, and determine whether a current position of the autonomous mobile body is included in the suspension possible area selected.

23. The path generating device according to claim 20, wherein the processor is configured or programmed to continue the autonomous movement currently being executed when the current position of the autonomous mobile body is not included in the suspension possible area.

24. An autonomous mobile body comprising:

a main body;

the path generating device according to claim 13; and a mover to move the main body along a movement path generated by the path generating device; wherein the mover includes a wheel and a traveling motor.

* * * * *